US012749005B2

(12) United States Patent
Li et al.

(10) Patent No.: US 12,749,005 B2
(45) Date of Patent: Sep. 29, 2026

(54) META-LEARNING DATA AUGMENTATION FRAMEWORK

(71) Applicant: Recruit Co., Ltd., Tokyo (JP)

(72) Inventors: Yuliang Li, Cupertino, CA (US); Xiaolan Wang, Mountain View, CA (US); Zhengjie Miao, Durham, NC (US)

(73) Assignee: Recruit Co., Ltd., Toyko (JP)

( * ) Notice: Subject to any disclaimer, the term of this patent is extended or adjusted under 35 U.S.C. 154(b) by 1127 days.

(21) Appl. No.: 17/246,354

(22) Filed: Apr. 30, 2021

(65) Prior Publication Data

US 2022/0351071 A1 Nov. 3, 2022

(51) Int. Cl.

| | |
|---|---|
| ***G06N 20/00*** | (2019.01) |
| ***G06F 16/21*** | (2019.01) |
| ***G06F 40/284*** | (2020.01) |
| ***G06F 40/56*** | (2020.01) |
| ***G06N 5/02*** | (2023.01) |

(52) U.S. Cl.

CPC ........... *G06N 20/00* (2019.01); *G06F 16/217* (2019.01); *G06F 40/284* (2020.01); *G06F 40/56* (2020.01); *G06N 5/027* (2013.01)

(58) Field of Classification Search

CPC ..................................................... G06N 20/00

See application file for complete search history.

(56) References Cited

U.S. PATENT DOCUMENTS

| | | | | |
|---|---|---|---|---|
| 11,875,120 B2 * | 1/2024 | Araki | ....................... | G06N 3/08 |
| 2019/0073560 A1 * | 3/2019 | Matei | ....................... | G06N 3/08 |

OTHER PUBLICATIONS

Hegde, Chaitra, and Shrikumar Patil. "Unsupervised paraphrase generation using pre-trained language models." arXiv preprint arXiv:2006.05477 (2020). (Year: 2020).*

Hu, Zhiting, Bowen Tan, Russ R. Salakhutdinov, Tom M. Mitchell, and Eric P. Xing. "Learning data manipulation for augmentation and weighting." Advances in Neural Information Processing Systems 32 (2019). (Year: 2019).*

M. M. El-Zahhar and N. F. El-Gayar, "A semi-supervised learning approach for soft labeled data," 2010 10th International Conference on Intelligent Systems Design and Applications, Cairo, Egypt, 2010, pp. 1136-1141, doi: 10.1109/ISDA.2010.5687034. (Year: 2011).*

Li, Yuliang, Jinfeng Li, Yoshihiko Suhara, AnHai Doan, and Wang-Chiew Tan. "Deep entity matching with pre-trained language models." arXiv preprint arXiv:2004.00584 (2020). (Year: 2020).*

(Continued)

*Primary Examiner* — Mariela Reyes

(74) *Attorney, Agent, or Firm* — Finnegan, Henderson, Farabow, Garrett & Dunner, LLP

(57) ABSTRACT

Disclosed embodiments relate to generating training data for a machine learning model. Techniques can include accessing a machine learning model from a machine learning model repository and identifying a data set associated with the machine learning model. The identified data set is utilized to generate a set of data augmentation operators. The data augmentation operators applied on a selected sequence of tokens associated with the machine learning model to generate sequences of tokens. A subset of sequences of tokens are selected and stored in a training data repository. The stored sequences of tokens are provided to the machine learning model as training data.

20 Claims, 18 Drawing Sheets

(56) References Cited

OTHER PUBLICATIONS

Crawshaw, Michael. “Multi-task learning with deep neural networks: A survey.” arXiv preprint arXiv:2009.09796 (2020). (Year: 2020).*

Rastogi, Chetanya, Nikka Mofid, and Fang-I. Hsiao. “Can we achieve more with less? exploring data augmentation for toxic comment classification.” arXiv preprint arXiv:2007.00875 (2020). (Year: 2020).*

International Search Repot and Written Opinion issued in related PCT International Application No. PCT/JP2021/044879; mailed Mar. 15, 2022 (10 pgs.).

Li, Yuliang et al., Deep Entity Matching with Pre-Trained Language Models, arXiv[online], Cornell University, Sep. 2, 2020 (15 pgs.).

Miao, Zhengjie et al., Snippext: Semi-supervised Opinion Mining with Augmented Data, arXiv [online], Cornell University, Feb. 7, 2020 (12 pgs.).

Miao, Zhengjie et al., Rotom: A Meta-Learned Data Augmentation Framework for Entity-Matching, Data Cleaning, Text Classification, and Beyond, Proceedings of the 2021 International Conference on Management of Data [online], Association for Computing Machinery, Jun. 18, 2021 (14 pgs.).

* cited by examiner

250

| **Title** | **Model** | **Price** |
| --- | --- | --- |
| *instant immersion spanish deluxe 2.0* | topics entertainment | 49.99 |

260

| **Title** | **Price** |
| --- | --- |
| *instant immers spanish delux 2.0* | 36.11 |

271

[COL] title [VAL] instant immers spanish delux 2.0
[COL] Model [VAL] topics entertainment [COL] price [VAL] 36.11

272

[COL] title [VAL] instant immers spanish delux 2.0
[COL] Model [VAL] NULL [COL] price [VAL] 36.11

Fig. 2B

280

| Name | Address | Phone |
|---|---|---|
| Google LLC | 1600 amphitheatre pkwy | (877) 355-578 |
| Alphabet inc. | 1600amphiteatrepkwy | 6502530000 |
| Apple Inc. | One Infinite Loop | (408) 606-5775 |

281

282

291

[COL] Name [VAL] Apple Inc. [COL] Address [VAL] One Infinite Loop [COL] phone [VAL] (408) 606-5775 [SEP] [COL] phone [VAL] (408) 606-5775

Fig. 2C

META-LEARNING DATA AUGMENTATION FRAMEWORK

BACKGROUND

Implementing natural language processing systems that allow computers to respond to natural language input is a challenging task. The task becomes increasingly difficult when machines attempt to understand expressed opinions in the input text and extract classification information based on limited training data. There is a need for techniques and systems that can respond to the needs of modern natural language systems in a time and cost-effective manner.

SUMMARY

Certain embodiments of the present disclosure relate to a non-transitory computer readable storage medium storing instructions that are executable by a data augmentation system that includes one or more processors to cause the data augmentation system to perform a method for generating training data for a machine learning model. The method can include accessing a machine learning model from a machine learning model repository; identifying a data set associated with the machine learning model; generating a set of data augmentation operators using the data set; selecting a sequence of tokens associated with the machine learning model; generating at least one sequence of tokens by applying at least one data augmentation operators of the set of augmentation operators on the selected sequence of tokens; selecting a subset of sequences of tokens from the generated at least one sequence of tokens; storing the subset of sequences of tokens in a training data repository; and providing the subset of sequences of tokens to the machine learning model.

According to some disclosed embodiments, generating a set of data augmentation operators using the data set further comprises: selecting one or more data augmentation operators; generating sequentially formatted input sequences of tokens of the identified data set; applying the one or more data augmentation operators to at least one sequence of tokens of the sequentially formatted input sequences of tokens to generate at least one modified sequences of tokens; and determining the set of augmentation operators to reverse the at least one modified sequences of tokens to corresponding sequentially formatted input sequences of tokens.

According to some disclosed embodiments, the accessed machine learning model is a sequence-to-sequence machine learning model.

According to some disclosed embodiments, selecting a subset of sequences of tokens further comprises: filtering at least one sequence of tokens from the generated at least one sequence of tokens using a filtering machine learning model; determining a weight of at least one sequence tokens in the filtered at least one sequence of tokens, using a weighting machine learning model; and applying the weight to at least one sequence of tokens of the filtered at least one sequence of tokens.

According to some disclosed embodiments, the weight of the at least one sequence of tokens is determined based on the importance of the sequence of tokens in training the machine learning model.

According to some disclosed embodiments, the importance of the at least one sequence of tokens is determined by calculating a validation loss of the machine learning model when trained using the at least one sequence of tokens.

According to some disclosed embodiments, filtering machine learning model is trained using the validation loss.

According to some disclosed embodiments, the weighting machine learning model is trained until the validation loss reaches a threshold value.

According to some disclosed embodiments, the at least one data augmentation operators includes at least one of token deletion operator, token insertion operator, token replacement operator, token swap operator, span deletion operator, span shuffle operator, column shuffle operator, column deletion operator, entity swap operator, back translation operator, class generator operator, inverse data augmentation operator.

According to some disclosed embodiments, the inverse data augmentation operator is a combination of multiple data augmentation operators.

According to some disclosed embodiments, the at least one data augmentation operators is context dependent.

According to some disclosed embodiments, wherein providing the subset of sequences of tokens as input to the machine learning model further comprises: accessing unlabeled data from an unlabeled data repository; generating augmented unlabeled sequences of tokens of the accessed unlabeled data; determining soft labels of the augmented unlabeled sequences of tokens; and providing the augmented unlabeled sequences of tokens with associated soft labels as input to the machine learning model.

Certain embodiments of the present disclosure relate to a non-transitory computer readable storage medium storing instructions that are executable by a data augmentation system that includes one or more processors to cause the data augmentation system to perform a method for generating data augmentation operators to generate augmented sequences of tokens. The method can include accessing unlabeled data from an unlabeled data repository; preparing one or more sequences of tokens of the accessed unlabeled data; transforming the one or more sequences of tokens to generate at least one corrupted sequence; providing as input one or more sequences of tokens and at least one corrupted sequence to a sequence-to-sequence model of the data augmentation system; executing the sequence-to-sequence model to determine at least one operations needed to reverse at least one corrupted sequence to the sequence in the one or more sequences of tokens used to generate the at least one corrupted sequence; and generating inverse data augmentation operators based on the determined one or more operations to reverse at least one corrupted sequence.

According to some disclosed embodiments, preparing one or more token sequences of the accessed unlabeled data further comprises: transforming each row in a database table into a sequence of tokens, wherein the sequence of tokens includes indicators for beginning and end of a column value.

According to some disclosed embodiments, transforming the one or more token sequences to generate at least one corrupted sequence further comprises: selecting a sequence of tokens from one or more sequences of tokens; selecting a data augmentation operator from a set of data augmentation operators; and applying the data augmentation operator to the selected sequence of tokens.

According to some disclosed embodiments, generating at least one corrupted sequence further comprises: generating an aggregate corrupted sequence by applying a plurality of data augmentation operators in a sequential order to the selected sequence of tokens.

Certain embodiments of the present disclosure relate to a non-transitory computer readable storage medium storing instructions that are executable by a data augmentation system that includes one or more processors to cause the data augmentation system to perform a method for extracting classification information from input data. The method can include adding task-specific layers to a machine learning model to generate a modified network; initializing the modified network of the machine learning model and the added task-specific layers; selecting input data entries, wherein the selection includes serializing the input data entries; providing the serialized input data entries to the modified network; and extracting classification information using the task-specific layers of the modified network.

According to some disclosed embodiments, the machine learning model further comprises: generating augmented data using at least one inverse data augmentation operator; and pre-training the machine learning model using the augmented data.

According to some disclosed embodiments, serializing the input data entries further comprises: identifying class token and other tokens in the input data entries; and marking the class token and the other tokens using different markers representing a beginning and end of each token.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 2B shows an exemplary tabular and sequential representation of data for an entity matching classification task, consistent with embodiments of the present disclosure.

FIG. 2C shows an exemplary tabular and sequential representation of data for an error detection classification task, consistent with embodiments of the present disclosure.

DETAILED DESCRIPTION

Figure 1:
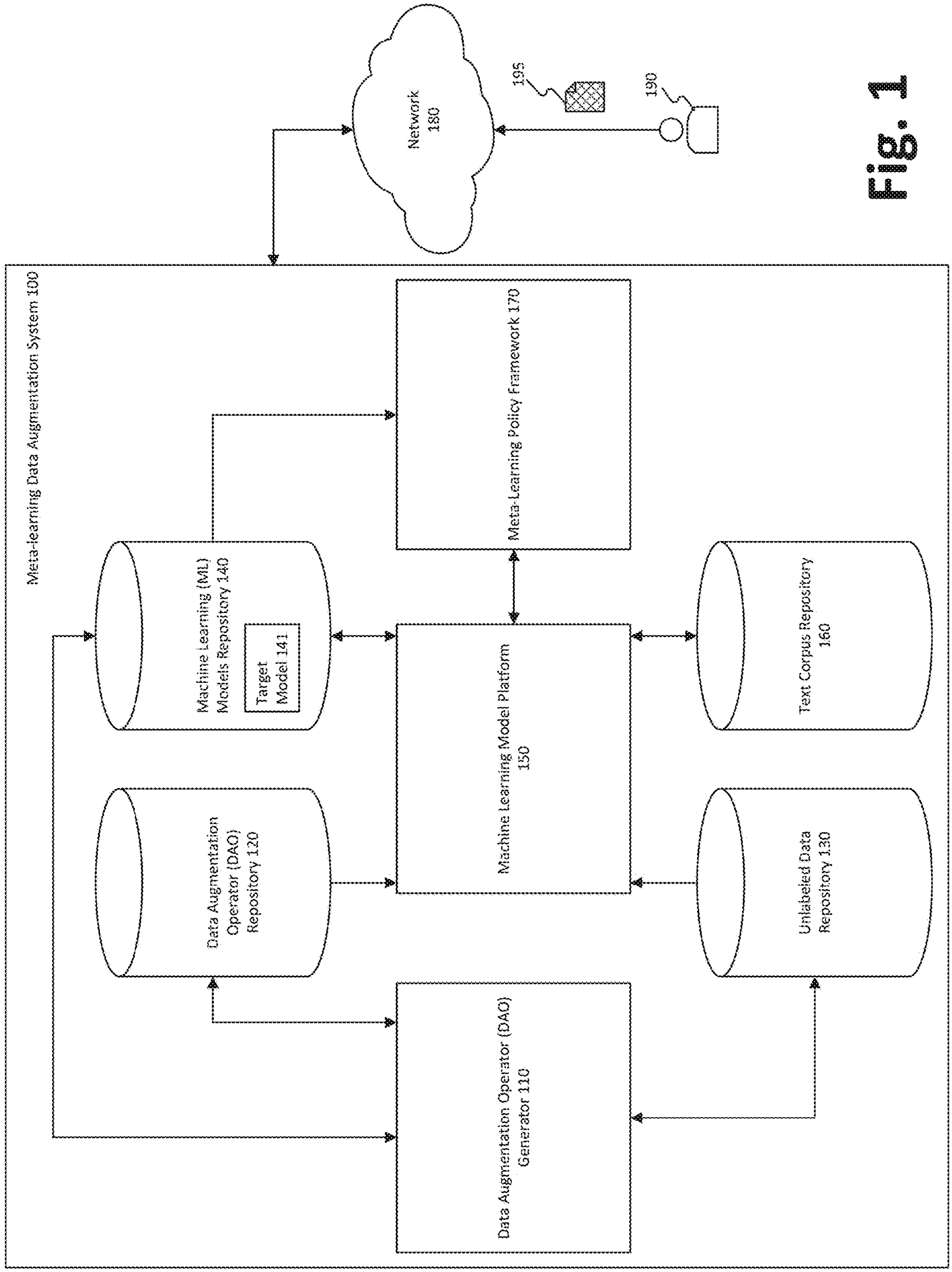
FIG. 1 is a block diagram showing an exemplary data augmentation system, consistent with embodiments of the present disclosure.

In the following detailed description, numerous details are set forth to provide a thorough understanding of the disclosed example embodiments. It is understood by those skilled in the art that the principles of the example embodiments can be practiced without every specific detail. The embodiments disclosed are exemplary and are not intended to disclose every possible embodiment consistent with the claims and disclosure. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The embodiments described herein provide technologies and techniques for data integration, data cleaning, text classification to extract classification information based on limited training data using natural language techniques by computing systems.

The described embodiments provide a distinct advantage over existing techniques of natural language processing. Existing natural language processing systems can need a large set of labeled training data to operate in an unsupervised manner. Alternatively, existing systems can apply a set of static operators against limited labeled data to generate additional data that is not diverse from the limited labeled data. Further, the labels of the limited labeled data may not be appropriate for the generated additional data. Thus, there is a need for generating operators that can, in turn, generate additional data with minimal supervision.

The embodiments disclosed herein can help generate data augmentation operators and perform various natural language processing tasks in a semi-supervised manner by generating diverse training data using generated data augmentation operators. The described embodiments can help with natural language processing tasks such as entity matching, error detection, data cleaning, and text classification, to name a few. The disclosed embodiments transform data into sequential representation to use the same operators to generate data for training for different natural language processing tasks listed above. This can provide significant advantages in natural language processing systems that may need to respond to different individuals or questions that often say the same thing but in different ways. By allowing for semi-supervised, data augmentation operators, and sequential data generation, the embodiments disclosed herein can improve the ability to use natural language processing in various industries and particularized contexts without the need for a time-consuming and expensive pre-training process.

FIG. 1 is a block diagram showing exemplary data augmentation system 100, consistent with embodiments of the present disclosure. Data augmentation system 100 can increase available data for a natural language processing task by generating additional data to augment the available data. Data augmentation system 100 can achieve the augmentation of additional data by updating portions of available data of sentences. Data augmentation system 100 can use data augmentation operators that can aid in performing updates to the available data. Data augmentation system 100 can use a static set of data augmentation of operators which can add, delete, replace and swap words in sentences in available data to generate augmented data. Data augmentation system 100 can also have the capability to generate new data augmentation operators performing more complex operations on available data to generate augmented data.

Data augmentation system 100 can include a data augmentation operator (DAO) generator 110 to generate augmentation operators that can generate data used for training a machine learning model. DAO generator 110 can be a set of software functions or a whole software program(s) applied to a sequence (for example, a text sentence) to generate transformed sequences. A processor (e.g., CPU 520 of FIG. 5 described below) can execute software functions and programs representing one or more components of data augmentation system 100, including DAO generator 110. The processor can be a virtual or physical processor of a computing device. Computing devices executing the software functions or programs can include a single processor or core or multiple processors or cores or can be multiple computing devices spread across a distributed computing environment, network, cloud, or virtualized computing environment.

A transformed sequence can include an original sequence with updates to one or more words of the original sequence. The updates can include adding, removing, replacing, or swapping words or phrases in the original sequence. The transformed sequences can help augment the original sequence as training data to a machine learning model. DAO generator 110 software functions can include data augmentation operators used to generate the transformed sequences to train a machine learning model. DAO generator 110 can generate data augmentation operators that can be stored in Data Augmentation Operator (DAO) repository 120 for later use.

DAO repository 120 can organize data augmentation operators by the machine learning model that intends to use the augmented sequences generated by the data augmentation operators. For example, DAO repository 120 can include a separate database for managing each set of data augmentation operators that generate a training set for training a machine learning model. In some embodiments, a data augmentation operator can have references to all machine learning models whose training data of augmented sequences are generated using the data augmentation operator. In some embodiments, DAO generator 110 can take as input an existing data augmentation operator of DAO repository 120 to generate new data augmentation operators. DAO repository 120 can store relationship information between previous data augmentation operators and new data augmentation operators generated using the previous data augmentation operators as input. In some embodiments, DAO repository 120 can include differences between new and previous data augmentation operators. DAO repository 120 can function as a version control managing multiple versions of a data augmentation operator generated and updated by DAO generator 110.

As illustrated in FIG. 1, data augmentation system 100 can also include data repositories, namely unlabeled data repository 130 and text corpus repository 160, that can be used for training a machine learning model. Unlabeled data repository 130 can also be provided as input to DAO generator 110 to generate data augmentation operators stored in DAO repository 120.

Unlabeled data repository 130 can include unannotated data (e.g., data that has not been labeled or annotated by humans or other processes). Unlabeled data repository 130 can be an RDBMS, an NRDBMS, or other types of data store. Unlabeled data repository 130 can provide a large quantity of data for training that is not annotated by humans or other processes, making it difficult to use for supervised learning of a natural language processing system. Data augmentation system 100 can use data augmentation operators of DAO repository 120 to generate additional unlabeled data for training a machine learning model (e.g., target model 141). Data augmentation system 100 can encode the unlabeled data in unlabeled data repository 130 and guess labels using the MixMatch method adjusted for natural language processing. The MixMatch method can guess low-entropy labels to be assigned to unlabeled data generated using data augmentation operators of DAO repository 120. The MixMatch method can receive feedback on the guessed labels to improve the guessing in future iterations. The MixMatch method can improve its label guessing ability based on the use of unlabeled data with guessed labels in downstream language processing tasks. Downstream language processing tasks can evaluate of the unlabeled data in training and use by machine learning models and provide feedback to MixMatch method on the guessed labels. Data augmentation system 100 can connect the unlabeled data of unlabeled data repository 130 with annotated guessed labels to additional data generated to satisfy target model 141 training data requirements. A detailed description of using unlabeled data repository 130 to generate additional data is presented in connection with FIG. 4A and its corresponding description below.

Data augmentation system 100 can also include Machine learning (ML) models repository 140 that can provide machine learning models for generating data augmentation operators in turn used to generate training data for other machine learning models in ML models repository 140. ML models repository 140 can also include ML models, such as target model 141, that can be trained using the additional training data to extract classification information. Data augmentation system 100 can use data stored in both text corpus repository 160 and unlabeled data repository 130 as input to train target model 141 to improve the extraction of classification information from an input sentence.

Data augmentation system 100 can use data augmentation operators in DAO repository 120 to generate additional data to train target model 141 to improve extraction of classification information from an input sentence. Target model 141 is a machine learning model and can include a plurality of layers. The plurality of layers can include fully connected layers or partially connected layers. Target model 141 can transform the data in text corpus repository 160, and unlabeled data repository 130 before other layers of target model 141 use the data. Target model 141 can be a language model that can use embedding layer 611 (as described in FIG. 6 below) to transform the data in text corpus repository 160 and unlabeled data repository 130. In some embodiments, target model 141 can be pre-trained. Transformation of data in text corpus repository 160 and unlabeled data repository 130 is presented in connection with FIG. 6 and its corresponding description below.

ML models repository 140 can provide target model 141 that can aid in the extraction of classification information of an input sentence. Target model 141 can include an encoding layer (e.g., embedding layer 611 and encoding layer 612 of FIG. 6) to transform the data from text corpus repository 160 and unlabeled data repository 130. Target model 141 can be a modified neural network architecture such as, for example, BERT, ELMO, etc. Transformation of data using target model 141 is presented in connection with FIGS. 7-9 and their corresponding descriptions below. Classification layers of target model 141 used to extract classification information are presented in connection with FIG. 10 and its corresponding description below.

In some embodiments, ML models repository 140 can provide a machine learning model as input to DAO generator 110 to generate data augmentation operators to generate additional training data. ML models repository 140 can provide sequence-to-sequence models as input to DAO generator 110 to generate data augmentation operators. In some embodiments, a sequence-to-sequence model can be a standard sequence-to-sequence model, such as the T5 model from Google. A detailed description of the sequence-to-sequence model used to generate data augmentation operators is presented in connection with FIGS. 2A-B and their descriptions below.

Figure 2A:
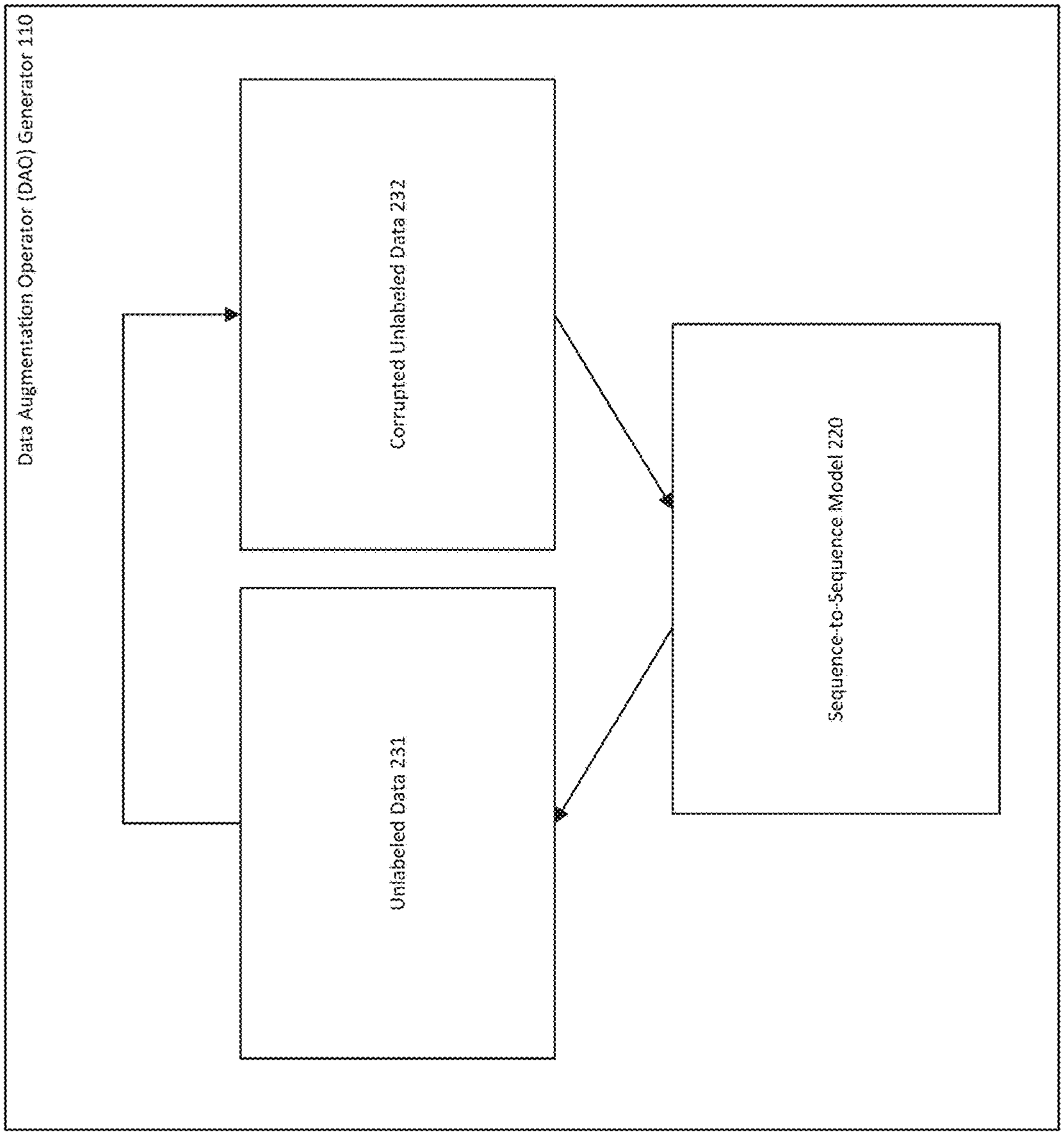
FIG. 2A is a block diagram showing an exemplary data augmentation operator generator, consistent with embodiments of the present disclosure.

FIG. 2A is a block diagram showing an exemplary Data Augmentation Operator (DAO) generator 110 (as shown in FIG. 1), consistent with embodiments of the present disclosure. DAO generator 110 can run independently of the rest of data augmentation system 100 components. DAO generator 110 can generate data augmentation operators irrespective of requests to generate additional training data using the generated data augmentation operators. DAO generator 110 can also receive requests directly to generate data augmentation operators.

As illustrated in FIG. 2A, DAO generator 110 can include sequence-to-sequence model 220 to generate new data augmentation operators to generate training data. The training data generated using the new data augmentation operators can be used to train machine learning models used for natural language processing tasks. Examples of natural language processing tasks are presented in connection with FIG. 10 and its corresponding description below. In some embodiments, sequence-to-sequence model 220 can be trained using the training data generated using the new data augmentation operators to improve its capability to generate data augmentation operators.

As illustrated in FIG. 2A, sequence-to-sequence model 220 interacts with unlabeled data 231-232 to generate the data augmentation operators. Sequence-to-sequence model 220 interface with unlabeled data 231-232 can include transforming input data to generate sequences of tokens. Sequence-to-sequence model 220 can interact with unlabeled data repository 130 (as shown in FIG. 1) to generate the sequential representation of data as sequences of tokens. Sequence-to-sequence model 220 can seek unlabeled data 231 from unlabeled data repository 130. In some embodiments, DAO generator 110 can populate unlabeled data 231 with data from unlabeled data repository 130. Data augmentation system 100 can share data from unlabeled data repository 130 to DAO generator 110 upon receiving a request to either generate new data augmentation operator or train a machine learning model. DAO generator can store data received from data augmentation system 100 as unlabeled data 231. In some embodiments, DAO generator 110 can receive labeled data from text corpus repository 160 (as shown in FIG. 1) to use to generate data augmentation operators.

Unlabeled data 231 can be a sequential representation of data generated by sequence-to-sequence model 220 using data from unlabeled data repository 130. In some embodiments, unlabeled data 231 can be generated using labeled data in text corpus repository 160 or a mix of labeled and unlabeled data. Sequential data representation can include identifying individual tokens in a text and including markers showing each token's beginning and end. The sequential data can include the markers and the tokens as a character string. In some embodiments, sequence-to-sequence model 220 can introduce only markers for the beginning of a token and can use the same markers as end markers for a preceding token. The input text from unlabeled data 231 can be sequentially represented by including a class type token marker "[CLS]" and other type token marker "[SEP]." For example, "The room was modern room" could be represented in sequential form as "[CLS] The room was modern [SEP] room," indicating two tokens the class token ("the room was modern") and another token ("room") identified using the markers "[CLS]" and "[SEP]." The format of sequential representation of data can depend on the text classification task for which unlabeled data 231 is used as training data to train data augmentation system 100. A data augmentation system (e.g., data augmentation system 100 of FIG. 1) trained for an intent classification task can include markers in a sentence sequence to indicate the beginning or end of the sequence. For example, the input sequence "where is the orange bowl?" used as input data for training for intent classification tasks could be represented in sequential form as "[CLS] where is the orange bowl? [SEP]."

In some embodiments, sequence-to-sequence model 220 can transform tabular input data to sequential representation before using it to generate data augmentation operators. In some embodiments data augmentation operators can include the functionality to serialize data before any transformation of the serialized data using augmentation functionality in the data augmentation operators. Sequence-to-sequence model 220 can transform tabular data into sequential data by converting each row of data to include markers for each column cell and its content value using markers "[COL] and "[VAL]." An example row in a table with contact information (in three columns, Name, Address, and Phone) can be sequentially represented as follows "[COL] Name [Val] Apple Inc. [COL] Address [VAL] 1 Infinity Loop [COL] Phone [VAL] 408-000-0000." In some embodiments, multiple rows of table data can be combined into a single sequence using an additional marker, such as "[SEP]" placed between tokens representing two rows. A detailed description of tabular data transformation to sequential representation is presented in connection with FIG. 2B and its corresponding description below.

FIG. 2B shows an exemplary tabular and sequential representation of data for entity matching classification task, consistent with embodiments of the present disclosure. As illustrated in FIG. 2B, tables 250 and 260 can represent training data for two entities that can be requested to be matched. DAO generator 110 can transform input data in tables 250 and 260 to serialized form as data 271 and 272, respectively, before transforming them to generate data augmentation operators. Missing columns in table 260, such as "Model," can be presented in serialized form by including missing column names with null values.

As illustrated in FIG. 2B, two entities represented by tables 250 and 260 can be input data for an entity matching task. Target model 141 can return a match for representing the same entity (a book with the title "Instant Immersion Spanish Deluxe 2.0"). Target model 141 can return a match based on pre-training of the model using the serialized form of one or both tables 250 and 260 as training data. During training of target model 141, data augmentation system 100 can serialize table 250 as data 271 and generate additional training data 272 by applying a data augmentation operator. For example, data 271 can be transformed to data 272 using a data augmentation operator performing a token replacement operation to replace the value "topics entertainment" with "NULL." Such transformation to generate training data can help train target model 131 to determine that entities represented by tables 250 and 260 represent the same entity (a book titled "Instant Immersion Spanish Deluxe 2.0"). A detailed description of training a machine learning model to conduct error detection classification tasks is presented in connection with FIG. 8 and its corresponding description below.

In some embodiments, the serialization process can depend on the purpose of generating data augmentation operators. A detailed description of serialization of data specific for error detection/data cleaning purposes is presented in connection with FIG. 2C and its description below.

FIG. 2C shows an exemplary tabular and sequential representation of data for an error detection classification task, consistent with embodiments of the present disclosure. Data 291 can represent a sequential presentation of a row in table 280. As described in FIG. 2A, a string of characters with markers "[COL]" and "[VAL]" can be used to indicate the beginning of each column name in a table row and value for the column in the table row.

For example, data 291 representing row 281 with three columns "Name," "Address," and "Phone" using "[COL]" markers followed by the same column names and "[VAL]" markers followed by values present in row 281 for each of the columns. Unlike FIG. 2B, where the complete tables were serialized as sequences for entity matching task, in an error detection task, a single row 281 is serialized using data 291.

As illustrated in FIG. 2C, serialized data 291 can include an additional portion indicating the column value which needs to be error corrected is presented using a "[SEP]" marker. The additional portion represents cell 282 in row 281 of table 280, which is being reviewed to detect errors and conduct data cleaning. A detailed description of training a machine learning model to conduct error detection classification tasks is presented in connection with FIG. 8 and its corresponding description below.

Referring back to FIG. 2A, Sequence-to-sequence model 220 can save serialized unlabeled data to unlabeled data 231. In some embodiments, DAO generator 110 can keep the serialized representation of data in temporary memory and discard them upon generating data augmentation operators.

DAO generator 110 can include corrupted unlabeled data 232 used as input to sequence-to-sequence model 220 to generate data augmentation operators. DAO generator 110 can generate corrupted unlabeled data 232 by applying existing data augmentation operators to unlabeled data 231. DAO generator 110 can access existing data augmentation operators from DAO repository 120 (as shown in FIG. 1). In some embodiments, data augmentation system 100 can provide existing data augmentation operators along with unlabeled data 231 to DAO generator 110. Existing data augmentation operators can transform a token or a span or the complete sequence of tokens of a serialized sequence of unlabeled data. For example, a token delete data augmentation operator can remove a single token in a sequence of tokens. In another scenario, a span replacement data augmentation operator can replace a series of words in a sentence represented by a sequence of tokens. In yet another scenario, a back translation data augmentation operator can translate the sequence of tokens representing a sentence to a different language and then translate it back to the sentence's original language that can result in a modified sequence of tokens. The updated sequence of tokens using existing data augmentation operators provided to DAO generator 110 are stored in corrupted unlabeled data 232.

Data in corrupted unlabeled data 232 can be generated by apply multiple existing data augmentation of operators on each sequence in unlabeled data 231. In some embodiments, DAO generator 110 can apply a different set of existing data augmentation operators to each sequence of tokens in unlabeled data 231. In some embodiments, DAO generator 110 can apply the same set or subset of existing data augmentation operators on each sequence in a different order. A data augmentation operator can be selected randomly from an existing set of data augmentation operators to achieve the application of different data augmentation operators. DAO generator 110 can select data augmentation operators in different orders to apply to each sequence of tokens to create the random effect on the sequences of tokens. The set of data augmentation operators applied to the sequence of tokens in unlabeled data 231 can be based on the topic of the unlabeled data 231. In some embodiments, the set of data augmentation operators applied can depend on the classification task conducted by a machine learning model (e.g., target model 141 of FIG. 1) that can in turn utilize the training data generated using the newly generated data augmentation operators.

Corrupted unlabeled data 232 can include a relationship to the original data in unlabeled data 231 transformed using existing data augmentation operators. The relationship can include a reference to the original sequence of tokens that is corrupted using a series of existing data augmentation operators. DAO generator 110 can use corrupted unlabeled data 232 as input to sequence-to-sequence model 220 to generate data augmentation operators. Sequence-to-sequence model 220 can generate data augmentation operators by determining a set of data transformation operations needed to revert a transformed sequence of tokens in corrupted unlabeled data 232 to the associated original sequence of tokens. Sequence-to-sequence model 220 can be pre-trained to learn about the transformation operations needed to revert a transformed sequence of tokens in a corrupted sequence to the original sequence. Sequence-to-sequence model 220 can determine transformation operations used to construct data augmentation operators. Such data augmentation operators constructed reversing the effecting of a transformation are called inverse data augmentation operators. A detailed description of inverse data augmentation construction is presented in connection with FIG. 13 and its corresponding description below. In some embodiments, DAO generator 110 can keep a record of all the existing data augmentation operators applied to an original sequence in unlabeled data 231 to generate a transformed sequence in corrupted unlabeled data 232. DAO generator 110 can associate the tracked existing data augmentation operators with the transformed sequences and store them in corrupted unlabeled data 232. Tracked set of existing data augmentation operators applied during transformation can be combined to generate data augmentation operators.

DAO generator 110 can transfer the generated inverse data augmentation operators to DAO repository 120. In some embodiments, DAO generator 110 can notify the data augmentation system 100 about the generated inverse data augmentation operators. Data augmentation system 100 can retrieve the inverse data augmentation operators from DAO generator 110 and store them in DAO repository 120. In some embodiments, DAO generator or Data augmentation system 100 can supply the inverse data augmentation operators to ML model platform 150 (as shown in FIG. 1) to generate new training data. DAO generator 110 can generate inverse data augmentation operators at regular intervals. In some embodiments, DAO generator 110 can generate inverse data augmentation operators when new data is added to unlabeled data repository 130 and/or text corpus repository 160.

Referring back to FIG. 1, in natural language processing systems, such as data augmentation system 100, opinions can be conveyed using different words or groupings of words that have a similar meaning. Data augmentation system 100 can identify the input sentences' opinions by extracting classification information using a machine learning model in machine learning models repository 140. Data augmentation system 100 can extract classification information by pre-training the target model 141 using limited training data in text corpus repository 160. Using the labeled data in text corpus repository 160, data augmentation system 100 can generate additional data (e.g., using ML model platform 150, described in more detail below) to generate multiple phrases conveying related opinions. The generated phrases can be used to create new sentences. The phrases themselves can be complete sentences.

By generating additional phrases according to the embodiments described, data augmentation system 100 can extract classification information cost-effectively and efficiently. Moreover, the data augmentation system 100, outlined above, and described in more detail below, can generate additional data from limited labeled data, which other existing systems may consider an insufficient amount of data. Data augmentation system 100 can utilize unlabeled data in unlabeled data repository 130 that be considered unusable by the existing systems.

Data augmentation system 100 can include Machine Learning (ML) model platform 150 that can be used to train a machine learning model. ML model platform 150 can access a machine learning model to train from Machine Learning (ML) models repository 140. ML model platform 150 can train a model from ML models repository 140 using data from text corpus repository 160 and/or unlabeled data repository 130 as input. ML model platform 150 can also take as input data augmentation operators from DAO repository 120 to generate additional training data to train the machine learning model.

In some embodiments, ML model platform 150 can connect with meta-learning policy framework 170 to determine if additional training data generated using data augmentation operators from DAO repository 120 can be used to train the machine learning model. A detailed description of components of meta-learning policy framework 170 is presented in connection with FIG. 3 and its corresponding description below.

Figure 3:
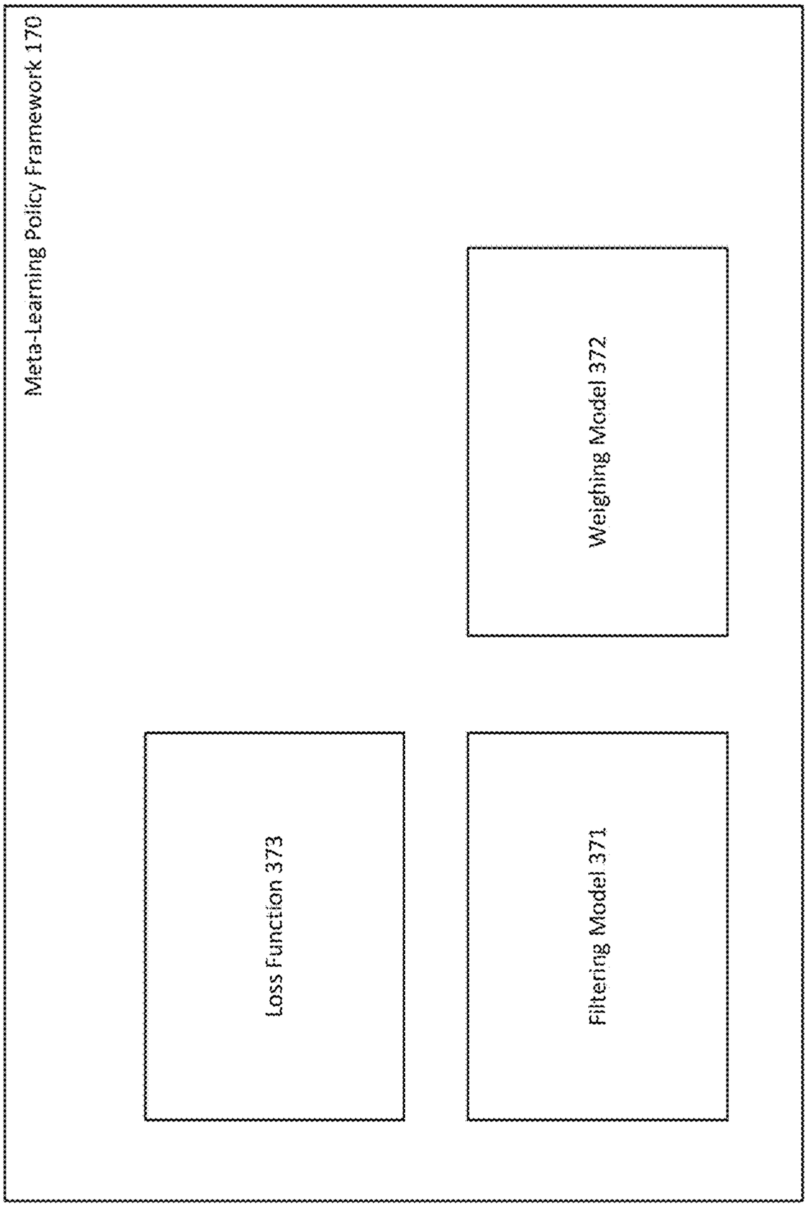
FIG. 3 is a block diagram showing an exemplary meta-learning policy framework, consistent with embodiments of the present disclosure.

FIG. 3 is a block diagram showing exemplary components of a meta-learning policy framework 170, consistent with embodiments of the present disclosure. Meta-learning policy framework 170 can help train machine learning models trained using ML model platform 150 (as shown in FIG. 1). Meta-learning policy framework 170 can help machine learning models learn by fine-tuning a machine learning model's training data populated using data augmentation operators. Meta-learning policy framework 170 can fine-tune the training data by learning to identify the most important training data and learning the effectiveness of the important training data in making a machine learning model (e.g., target model 141 of FIG. 1) learn. Fine tuning can include adjusting the weights of each sequence of tokens in the training data. Meta-learning policy framework 170 can use machine learning models to learn to identify important training data from data generated using data augmentation operators in DAO repository 120 (as shown in FIG. 1) applied to training data in text corpus repository 160 (as shown in FIG. 1).

Components of Meta-learning policy framework 170 can include machine learning models filtering model 371, weighting model 372 to identify important sequences of tokens to use as training data for a machine learning model. Meta-learning policy framework 170 can also include learning capability to improve the identification of sequences of tokens. Meta-learning policy framework 170 can help improve machine learning models' training through iterations of improved identification of important sequences of tokens used as input to the machine learning models. Meta-learning policy framework 170 also includes a loss function 373 that can assist filtering model 371 and weighting model 372 improve their identification of important sequences of tokens to train the machine learning model. Loss function 373 can help improve filtering model 371 and weighting model 372 identification capabilities by evaluating the effectiveness of a machine learning model trained using data identified by filtering model 371 and weighting model 372. Loss function 373 can help teach filtering model 371 and weighting model 372 to learn how to identify important data for training a machine learning model. Utilization of loss function 373 to improve filtering model 371 and weighting model 372 is presented in connection with FIG. 4A and its corresponding description below.

Filtering model 371 can help filter out unwanted sequences generated using data augmentation operators applied to sequences in text corpus repository 160 by ML model platform 150. Filtering model 371 can be a binary classifier that can decide whether to consider or discard an augmented sequence generated by ML model platform 150 by applying data augmentation operators (generated by DAO generator 110 of FIG. 1) stored in DAO repository 120. Filtering model 371 can be a machine learning model that can be trained using the same sequences generated to train a machine learning model (e.g., target model 141). The binary classification task in filtering model 371 can be context-dependent, based on the machine learning model's classification task. Filtering model 371 can classify based on the uniqueness of an augmented sequence, such as new tokens introduced by data augmentation operators to the original sequence of tokens (in text corpus repository 160).

Filtering model 371 can be used to quickly filter augmented sentences when the number of augmented sentences is above a certain threshold. In some embodiments, filtering model 371 can filter augmented examples based on certain pre-determined conditions. A user (e.g., user 190 of FIG. 1) can supply the conditions and configured using a configuration file provided as part of a request (e.g., request 195 of FIG. 1) to data augmentation system 100. In some embodiments, filtering model 371 can intelligently filter certain augmented sentences based on the data augmentation operators applied to existing sequences to generate augmented sequences. The selection of certain data augmentation operators and the augmented sequences produced by them can be based on the existing sequences' topic. In some embodiments, filtering model 371 can be applied to data augmentation operators instead of the augmented sentences generated by data augmentation operators.

The weighting model 372 can determine the importance of the selected examples by assigning them weight to the augmented sequences to compute the loss of a machine learning model training using the augmented sequences. In some embodiments, weighting model 372 can be directly applied to the augmented examples generated using data augmentation operators of DAO repository 120. In some embodiments, weighting model 372 can determine which data augmentation operators can be used more than the others by applying weight to the data augmentation operator instead of the augmented sequences.

A loss function 373 can be used to train filtering model 371 and weighting model 372. In some embodiments, loss function 373 can be a layer of the target machine learning model (e.g., target model 141) that can help evaluate the validation loss values when executing the target machine learning model to classify validation sequences set. Validation loss calculation and back-propagating of loss values are presented in connection with FIG. 4B and its corresponding description below.

Referring back to FIG. 1, ML Model platform 150 can use data augmentation operators in DAO repository 120 to process data in text corpus repository 160 to generate additional training data for a machine learning model. Data augmentation operators can process data in text corpus repository 160 to generate additional labeled data by updating one or more portions of existing text sentences. In some embodiments, data augmentation operators can receive some or all of the sentences directly as input from a user (e.g., user 190) instead of loading them from text corpus repository 160.

ML model platform 150 can store the additional data (e.g., in the form of sentences) in text corpus repository 160 for later use. In some embodiments, the additional data is temporarily stored in memory and supplied to DAO generator 110 to generate additional training data. Text corpus repository 160 can receive and store the additional data generated by ML model platform 150.

ML model platform 150 can select different data augmentation operators to apply to input data selected from text corpus repository 160 to generate additional data. The ML model platform 150 can select a different data augmentation operator for each input data sentence. ML model platform 150 can also select data augmentation operators based on predefined criteria or in a random manner. In some embodiments, ML model platform 150 can apply the same data augmentation operator for a set of sentences or a set period.

Text corpus repository 160 can be pre-populated using a corpus of sentences. In some embodiments, text corpus repository 160 saves a set of input sentences supplied by a user before passing them to other components of data augmentation system 100. In other embodiments, the sentences in text corpus repository 160 can be supplied by a separate system. For example, text corpus repository 160 can include sentences supplied by user input, other systems, other data sources, or feedback from data augmentation system 100 or its components. As described above in reference to unlabeled data repository 130, text corpus repository 160 can be a Relational Database Management System (RDBMS) (e.g., Oracle Database, Microsoft SQL Server, MySQL, PostgreSQL, or IBM DB2). An RDBMS can be designed to efficiently return data for an entire row, or record, from the database in as few operations as possible. An RDBMS can store data by serializing each row of data in a data structure. In an RDBMS, data associated with a record can be stored serially such that data associated with all categories of the record can be accessed in one operation. Moreover, an RDBMS can efficiently allow access to related records stored in disparate tables. For example, in an RDBMS, tables can be linked by a referential column, and the RDBMS can join tables together to retrieve data for a data structure. In some embodiments, the text corpus repository 160 can be a non-relational database system (NRDBMS) (e.g., XML, Cassandra, CouchDB, MongoDB, Oracle NoSQL Database, FoundationDB, or Redis). A non-relational database system can store data using a variety of data structures such as, among others, a key-value store, a document store, a graph, and a tuple store. For example, a non-relational database using a document store could combine all of the data associated with a particular identifier into a single document encoded using XML. The text corpus repository 160 can also be an in-memory database such as Memcached. In some embodiments, the contents of text corpus repository 160 can exist both in a persistent storage database and in an in-memory database, such as is possible in Redis. In some embodiments, text corpus repository 160 can be stored on the same database as unlabeled data repository 130.

Data augmentation system 100 can receive requests for various tasks, including generating data augmentation operators to generate augmented data to train machine learning models. Requests to data augmentation system 100 can include generating augmented data for training machine learning models, and extracting classification information using machine learning models. Data augmentation system 100 can receive various requests over network 180. Network 180 can be a local network, the Internet, or a cloud network. User 190 can send requests for various tasks listed above to data augmentation system 100 over network 180. User 190 can interact with data augmentation system 100 over a tablet, laptop, or portable computer using a web browser or an installed application. User 190 can send request 195 over network 180 to data augmentation system 100 to generate augmented data, and operators to train machine learning model and extract classification information using the machine learning model.

The components of data augmentation system 100 can run on a single computer or can be distributed across multiple computers or processors. The different components of data augmentation system 100 can communicate over a network (e.g., LAN or WAN) 180 or the Internet. In some embodiments, each component can run on multiple compute instances or processors. The instances of each component of the data augmentation system 100 can be a part of a connected network such as a cloud network (e.g., Amazon AWS, Microsoft Azure, Google Cloud). In some embodiments, some, or all, of the components of data augmentation system 100 are executed in virtualized environments such as a hypervisor or virtual machine.

Figure 4A:
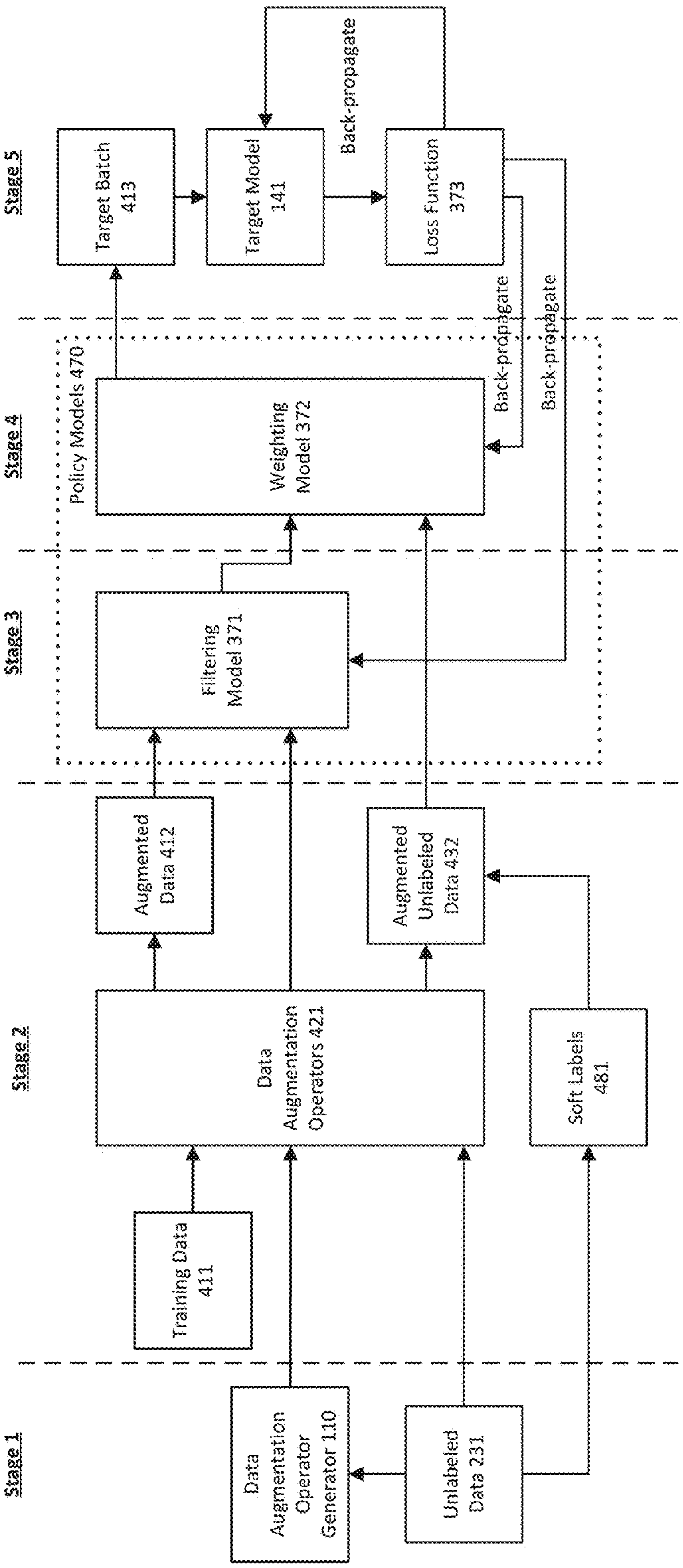
FIG. 4A shows an exemplary data flow diagram of the meta learning data augmentation system of FIG. 1 used for sequence classification tasks, consistent with embodiments of the present disclosure.

FIG. 4A shows an exemplary data flow diagram of meta-learning data augmentation system 100 used for sequence classification tasks, consistent with embodiments of the present disclosure. The components illustrated in FIG. 4A refer back to components described in FIGS. 1-3, and, where appropriate, the labels for those components use the same label number as used in earlier figures.

As illustrated in FIG. 4A, the data flow diagram shows an example flow of data between components of the data augmentation system from DAO generator 110 in stage 1 to target model 456 and loss function 373 in stage 5. Data flow can result in training various machine learning models to generate new training data and use training data to train a machine learning model designed for various natural language processing tasks.

In stage 1, DAO generator 110 can receive unlabeled data 231 as input to generate a set of data augmentation operators 421. Data augmentation operators 421 can be different from baseline data augmentation operators, such as operators to insert, delete, and swap tokens or spans. Baseline data augmentation operators used for generating inverse data augmentation operators are presented in connection with FIG. 2A and its corresponding description above. As described in FIG. 2A, DAO generator 110 can generate data augmentation operators that can produce arbitrary augmented sentences that are very different in structure from the original sentences but can retain the original sentence's topic. Baseline data augmentation operators acting on tokens or spans on a sentence sequence may not produce such diverse and meaningful augmented sentences. For example, a simple token swap baseline operator may swap a synonym when applied to an original sentence "where is the Orange Bowl?" to produce "Where is the Orangish Bowl." Instead, the application of inverse data augmentation operators to the original sentence can produce diverse augmented sentences such as "Where is the Indianapolis Bowl in New Orleans?" or "Where is the Syracuse University Orange Bowl?" that still maintain the topic (football). In another scenario, a baseline token deletion operator applied to the original sentence can result in "is the Orange Bowl?" which loses the structure and is grammatically wrong. By utilizing inverse data augmentation operators, data augmentation system 100 can produce a diverse set of augmented sentences to train a machine learning model in later stages, as described below.

In stage 2, the newly generated inverse data augmentation operators stored as data augmentation operators 421 can be applied to the existing training data 411 of text corpus repository 160 to produce augmented data 412. A subset of data augmentation operators of data augmentation operators 421 can produce augmented data 412 by applying each data augmentation operator to generate multiple augmented sentences. In some embodiments, data augmentation system 100 can skip applying some data augmentation operators to certain sentences in training data 411. Selective application of data augmentation operators on an original sentence of training data 411 can be preconfigured or can be based on the configuration provided by a user (e.g., user 190 of FIG. 1) beforehand or along with a request (e.g., request 195 of FIG. 1) to data augmentation system 100.

In some embodiments, unlabeled data 231 can be used to generate additional training data. Unlabeled data 231 needs to be associated with labels before utilization as additional training data. As illustrated in FIG. 4A, data augmentation system 100 can generate soft labels 481 to be associated with unlabeled data 231 and additional augmented unlabeled data 432 generated using the unlabeled data 231.

Unlabeled data 231 and augmented unlabeled data 432 can have soft labels 481 applied using a close guess algorithm. A close guess algorithm can be based on the proximity of sequences in unlabeled data 231 and training data 411. Proximity of the sequences can be determined based on the proximity of vectors encoded representations of sequences in unlabeled data 231 and training data 411. In some embodiments, the label determination process can include averaging multiple versions of labels generated by a machine learning model. The averaging process can include averaging vectors representing the multiple labels. This label determination process can be part of MixMatch method as described in FIG. 1 above. Soft labels 481 are character strings that can be obtained using one of the methods described above.

Unlabeled data 231 can be associated with soft labels 481 applied using a close guess algorithm. A close guess algorithm can be based on the proximity of unlabeled sequences of unlabeled data 231, labeled sequences of training data 411, and augmented sequences of augmented data 412. The proximity of the sequences can be determined based on the proximity of vectors of the sequences. In some embodiments, the label determination process can include averaging multiple versions of labels. The averaging process can include averaging vectors representing the multiple labels. Soft labels 481 associated with sequences of unlabeled data 231 can also be associated with sequences of augmented unlabeled data 432. Soft labels 481 association with augmented unlabeled data 432 can be based on the relationship between sequences of unlabeled data 231 and augmented unlabeled data 432. In some embodiments, a sequence of unlabeled data 231 can share the same soft label with augmented sequences of augmented unlabeled data 432 generated from it (by applying data augmentation operators 421). Data augmentation system 100 can generate soft labels to associate augmented sequences of augmented unlabeled data 432 using the close guess algorithm discussed above. Data augmentation system 100 uses Policy models 470 in later stages to identify the training data that meets the policy. The policy models 470 can help set the quality of training data for training to a machine learning model (e.g., target model 141). Policy models 470 can be implemented using machine learning models filtering model 371 and weighting model 372.

In stage 3, the new set of training data present in augmented data 412 and augmented unlabeled data 432 is reviewed to identify high-quality training data using filtering model 371. Filtering model 371 engages in a strict determination of whether to include certain sequences of augmented data 412, augmented unlabeled data 432. In some embodiments, filtering model 371 can apply different filtering strategies to filter augmented data 412 and augmented unlabeled data 432. A detailed description of filtering model 371 is presented in connection with FIG. 3 and its corresponding description above.

In stage 4, data augmentation system 100 can further identify the most important training data from the filtered set of training data using weighting model 372. Unlike the strict determination method of filtering model 471, weighting model 472 reduces certain sequences' effect in training a machine learning model by associating a weight to the sequence. Machine learning model consuming a sequence for training can ignore its results if low weight is applied to the sequence by weighting model 372. A detailed description of weighting model 372 is presented in connection with FIG. 3 and its corresponding description above.

In stage 5, the target batch 413 of sequences identified by the set policy models 470 implemented by filtering model 371 and weighting model 372 can be used to train target model 141. Target model 141 can also be fine-tuned using a loss function 373.

Loss function 373 can fine-tune the target model 141 behavior for the provided target batch 413 and other machine learning models, such as filtering model 371 and weighting model 372, in determining the sequences to include in the target batch 413. Loss function 373 can fine-tune machine learning models by determining the amount of deviation between the original data (e.g., training data 411) and the data generated through the process represented by stages 1 to 4. Loss function 373 can be a cross entropy loss or an L2 loss function. Loss function 373 can be used to compare the probabilistic output of the machine learning model from a SoftMax layer (as described below in FIG. 10) to compute a score on dissimilarity between output and label.

Figure 10:
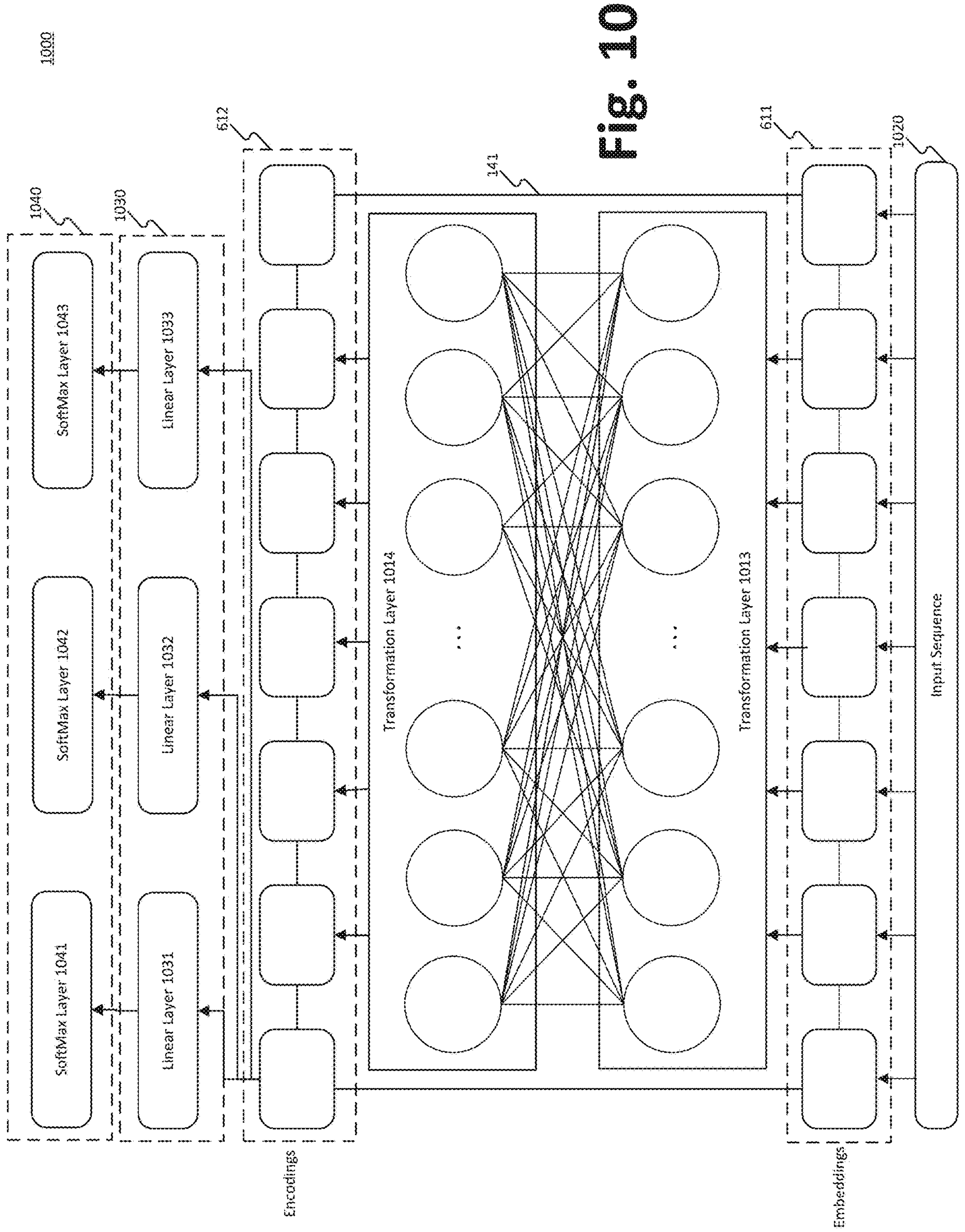
FIG. 10 shows an exemplary language machine learning model with specific layers, consistent with embodiments of the present disclosure.

The back-propagation step of stage 5 (shown in FIGS. 4A and 4B as an arrow between loss function 373 and machine learning models, namely target model 141, filtering model 371, and weighting model 372) can update linear layers 1031-1033 (as shown in FIG. 10 below) to aid in classification tasks and other layers of target model 141. The update can result in the generation of more accurate predictions for future usage of the models and layers. Various techniques such as the Adam algorithm, Stochastic Gradient Descent (SGD), and SGD with Momentum can be used to update parameters in layers in target model 141 and other layers.

Figure 4B:
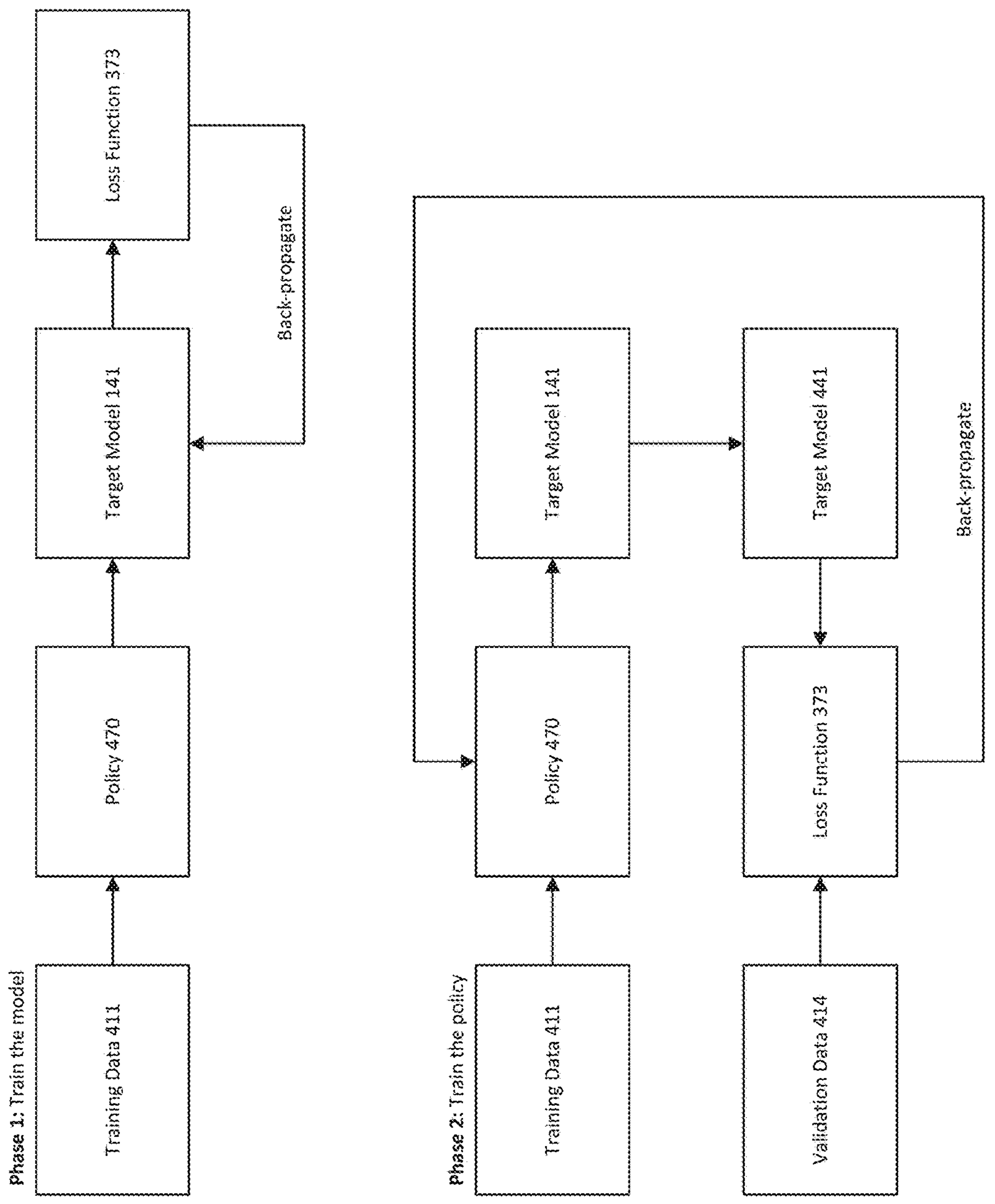
FIG. 4B shows an exemplary back-propagation technique to fine-tune a machine learning model and an exemplary policy managing training data for a machine learning model, consistent with embodiments of the present disclosure.

FIG. 4B shows an exemplary back-propagation technique to fine-tune a machine learning model and a policy managing the training data to the machine learning model, consistent with embodiments of the present disclosure. As illustrated in FIG. 4B, the two-phase back-propagation process shows data flow that jointly trains policy models 470 and target model 141.

In phase 1, loss function 373 can back-propagate success levels of target model 141 irrespective of the behavior of policy models 470. Target model 141, upon receipt of success level, can determine whether to use the current training data (e.g., training data 411) or request for an updated training data set.

In phase 2, the back-propagation process can optimize policy models 470, including filtering model 371 and weighting model 372, so they can generate more effective augmented sequences to train target model 141. Policy models 470 can generate a batch of selected augmented sequences using the training data 411 supplied to target model 141 to train and generate the updated target model 441. The updated target model 441 can then be used to calculate loss using validation data 414. The calculated loss can be used to update the policy models 470 by back-propagating loss values to policy models 470. Policy models 470 can review the calculated loss to improve and reduce the loss from updated target model 441. The second phase of the back-propagation process can train the data augmentation policy defined by policy models 470 such that the trained model can perform well on validation data 414.

Figure 5:
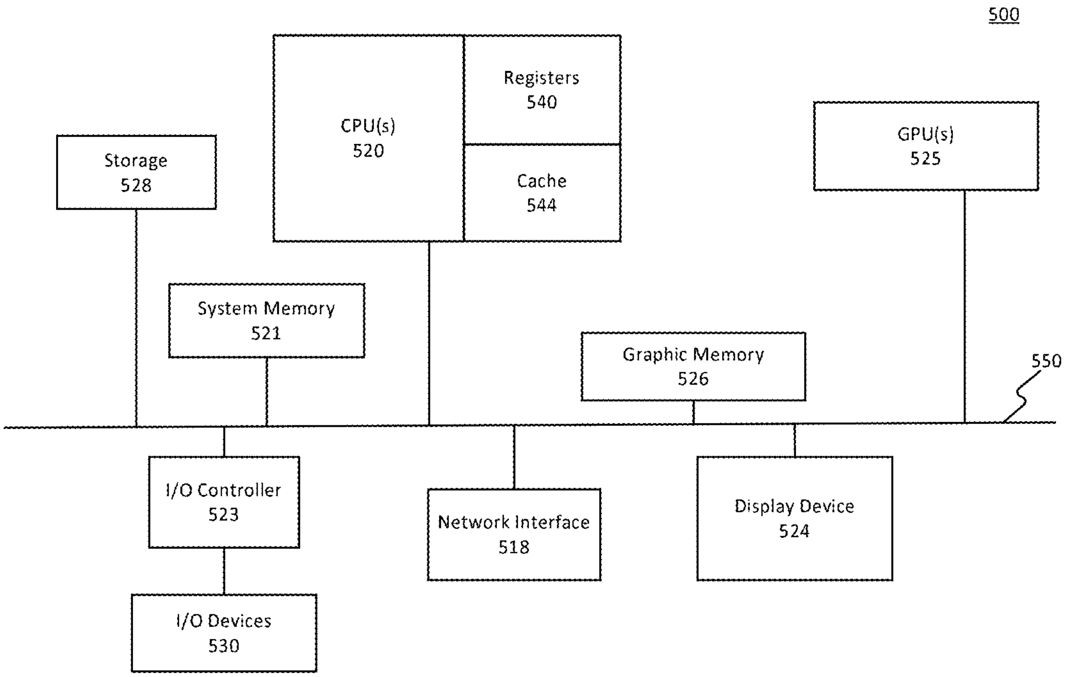
FIG. 5 is a block diagram of an exemplary computing device, consistent with embodiments of the present disclosure.

FIG. 5 is a block diagram of an exemplary computing device 500, consistent with embodiments of the present disclosure. In some embodiments, computing device 500 can be a specialized server providing the functionality described herein. In some embodiments, components of data augmentation system 100, such as DAO generator 110, ML model platform 150, and meta-learning policy framework 170 of FIG. 1, can be implemented using the computing device 500 or multiple computing devices 500 operating in parallel. In some embodiments, multiple repositories of data augmentation system 100, such as DAO repository 120, unlabeled data repository 130, ML models repository 140, and text corpus repository 160, can be implemented using computing device 500. In some embodiments, models stored in ML models repository 140, such as target model 141, sequence-to-sequence model 220, filtering model 371, weighting model 372, can be implemented using computing device 500. Further, the computing device 500 can be a second device providing the functionality described herein or receiving information from a server to provide at least some of the described functionality. Moreover, the computing device 500 can be an additional device or devices that store or provide data consistent with embodiments of the present disclosure and, in some embodiments, computing device 500 can be a virtualized computing device such as a virtual machine, multiple virtual machines, or a hypervisor.

Computing device 500 can include one or more central processing units (CPUs) 520, storage 528, and a system memory 521. Computing device 500 can also include one or more graphics processing units (GPUs) 525 and graphic memory 526. In some embodiments, computing device 500 can be a headless computing device that does not include GPU(s) 525 or graphic memory 526.

CPUs 520 can be single or multiple microprocessors, field-programmable gate arrays, or digital signal processors capable of executing sets of instructions stored in a memory (e.g., system memory 521), a cache (e.g., cache 544), or a register (e.g., one of registers 540). CPUs 520 can contain one or more registers (e.g., registers 540) for storing various types of data including, inter alia, data, instructions, floating-point values, conditional values, memory addresses for locations in memory (e.g., system memory 521 or graphic memory 526), pointers and counters. CPU registers 540 can include special-purpose registers used to store data associated with executing instructions such as an instruction pointer, an instruction counter, or a memory stack pointer. System memory 521 can include a tangible or a non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive or flash memory, processor cache, memory register, or a semiconductor memory. System memory 521 can be one or more memory chips capable of storing data and allowing direct access by CPUs 520. System memory 521 can be any type of random-access memory (RAM), or other available memory chip capable of operating as described herein.

CPUs 520 can communicate with system memory 521 via a system interface 550, sometimes referred to as a bus. In embodiments that include GPUs 525, GPUs 525 can be any type of specialized circuitry that can manipulate and alter memory (e.g., graphic memory 526) to provide or accelerate the creation of images. GPUs 525 can have a highly parallel structure optimized for processing large, parallel blocks of graphical data more efficiently than general-purpose CPUs 520. Furthermore, the functionality of GPUs 525 can be included in a chipset of a special purpose processing unit or a co-processor.

CPUs 520 can execute programming instructions stored in system memory 521 or other memory, operate on data stored in memory (e.g., system memory 521), and communicate with GPUs 525 through the system interface 550, which bridges communication between the various components of the computing device 500. In some embodiments, CPUs 520, GPUs 525, system interface 550, or any combination thereof, are integrated into a single chipset or processing unit. GPUs 525 can execute sets of instructions stored in memory (e.g., system memory 521), to manipulate graphical data stored in system memory 521 or graphic memory 526. For example, CPUs 520 can provide instructions to GPUs 525, and GPUs 525 can process the instructions to render graphics data stored in the graphic memory 526. Graphic memory 526 can be any memory space accessible by GPUs 525, including local memory, system memory, on-chip memories, and hard disk. GPUs 525 can enable displaying of graphical data stored in graphic memory 526 on display device 524 or can process graphical information and provide that information to connected devices through network interface 518 or I/O devices 530.

Computing device 500 can include a display device 524 and input/output (I/O) devices 530 (e.g., a keyboard, a mouse, or a pointing device) connected to I/O controller 523. I/O controller 523 can communicate with the other components of computing device 500 via system interface 550. It should now be appreciated that CPUs 520 can also communicate with system memory 521 and other devices in manners other than through system interface 550, such as through serial communication or direct point-to-point communication. Similarly, GPUs 525 can communicate with graphic memory 526 and other devices in ways other than system interface 550. In addition to receiving input, CPUs 520 can provide output via I/O devices 530 (e.g., through a printer, speakers, bone conduction, or other output devices).

Furthermore, the computing device 500 can include a network interface 518 to interface to a LAN, WAN, MAN, or the Internet through a variety of connections including, but not limited to, standard telephone lines, LAN or WAN links (e.g., 802.21, T1, T3, 56 kb, X.25), broadband connections (e.g., ISDN, Frame Relay, ATM), wireless connections (e.g., those conforming to, among others, the 802.11a, 802.11b, 802.11b/g/n, 802.11ac, Bluetooth, Bluetooth LTE, 3GPP, or WiMax standards), or some combination of any or all of the above. Network interface 518 can comprise a built-in network adapter, network interface card, PCMCIA network card, card bus network adapter, wireless network adapter, USB network adapter, modem, or any other device suitable for interfacing the computing device 500 to any type of network capable of communication and performing the operations described herein.

Figure 6:
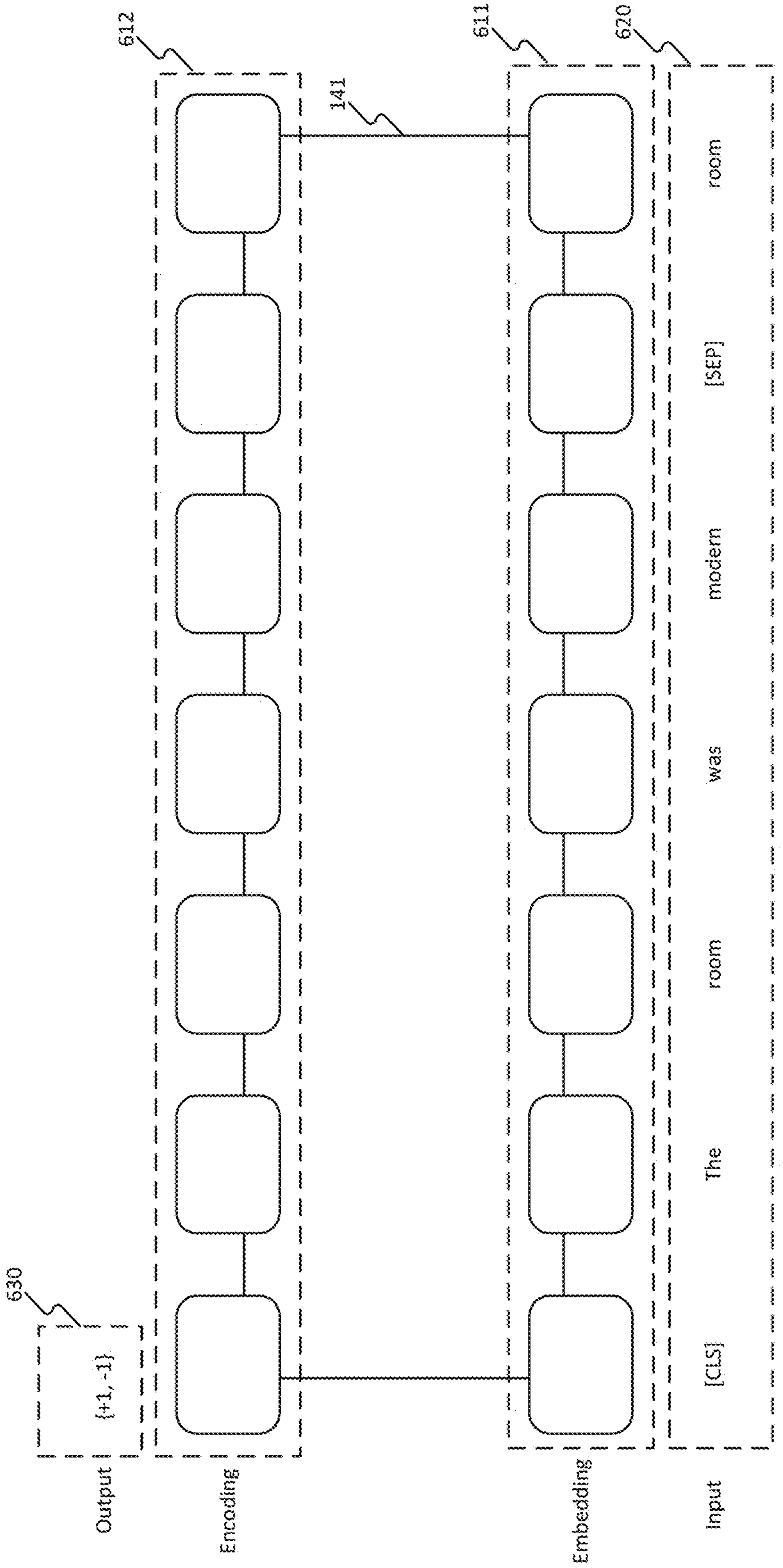
FIG. 6 shows an exemplary language machine learning model for sequence classification tasks, consistent with embodiments of the present disclosure.

FIG. 6 shows an exemplary machine learning model, such as target model 411 for sequence classification tasks, consistent with embodiments of the present disclosure. Target model 141 can be a pre-trained machine learning model, such as BERT, DistilBERT, RoBERTa, etc. Target model 141 can be used for various classification tasks that retrieve classification information embedded in an input sentence. Classification information can be a label of a class of labels assigned to an input sentence. Classification information can include sentiment, topic, intent conveyed in an input sentence. For example, a product review input sentence can be supplied to a language machine learning model to retrieve sentiment classification information. The sentiment classification information can be part of a class of values defined by a user (e.g., user 190 of FIG. 1) of target model 141. For example, a product review input sentence's sentiment analysis can result in positive, negative, or neutral sentiments represented values +1, −1, and 0, respectively. In some embodiments, input to target model 141 can be input text of multiple sentences. In some embodiments, input to target model 141 can be a question or a statement.

As illustrated in FIG. 6, target model 141 can take input in a sequential form. For example, an input sentence "The room was modern room" can be transformed into a sequence of tokens as "[CLS] The room was modern [SEP] room" indicating the beginning of a sequence of tokens using "[CLS]" and other tokens separated by "[SEP]" symbol. In some embodiments, the format of sequential representation of data can depend on the text classification task for which an input sequence is used as training data. A data augmentation system (e.g., data augmentation system 100 of FIG. 1) trained for an intent classification task can include markers in a sentence sequence to indicate the beginning or end of the sequence. For example, the input sequence "where is the orange bowl?" used as input data for training for intent classification tasks could be represented in sequential form as "[CLS] where is the orange bowl? [SEP]."

As illustrated in FIG. 1, target model 141 upon input of product review sentence 620 can generate the output 630. Output 630 is a set of sentiment value represented by numerical set {+1, −1}. Product review sentence 620 can result in more than one sentiment value of the set of sentiment values. In some embodiments, output sentiment value can be an aggregate of the multiple sentiment values. The aggregate sentiment value can be a simple summation of all sentiment values. In some embodiments, a weight can be applied to each sentiment value before aggregating to generate a combined sentiment value of the input sentence 610. Input token sequence (e.g., product review sentence 620) can be generated using a data augmentation operator of DAO repository 120. A data augmentation operator used to generate the input token sequence can be an inverse data augmentation operator generated using DAO generator 110.

Figure 7:
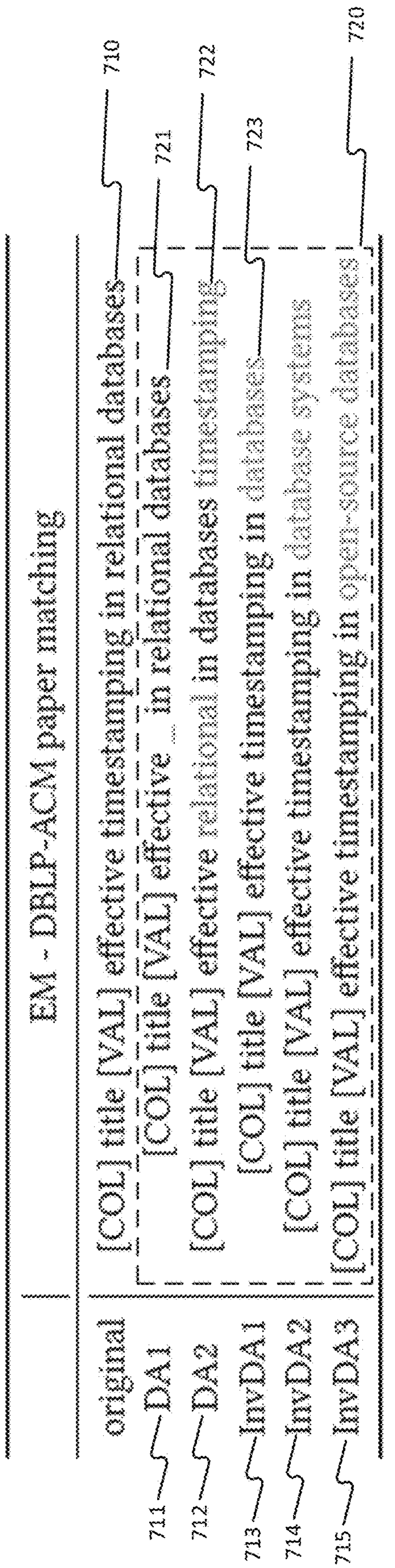
FIG. 7 shows an exemplary sequence listing for entity matching as a sequence classification task, consistent with embodiments of the present disclosure.

FIG. 7 shows an exemplary sequence listing for entity matching as a sequence classification task, consistent with embodiments of the present disclosure. The listing original sequence 710 and modified sequences 720 generated using data augmentation operators 711-75. Baseline data augmentation operators 711-712 do a simple token modification, resulting in sequences that are either incorrect syntactically (for example, augmented sequence 721) or semantically (for example, augmented sequence 722). The data augmentation operators 711-715 can be independent of the specific tasks conducted by a machine learning model. Data augmentation system 100 can allow training data for various classification tasks (as described in FIGS. 2A-2C) represented in the same serialized form used for training a machine learning model (e.g., target model 141 of FIG. 1). Data augmentation system 100 can uniformly represent different data in a serialized form by applying the same data augmentation operators. Application of same data augmentation operators 711-715 to training data used for training machine learning models for error detection and text classification is provided in FIGS. 8 and 9 descriptions below.

Figure 8:
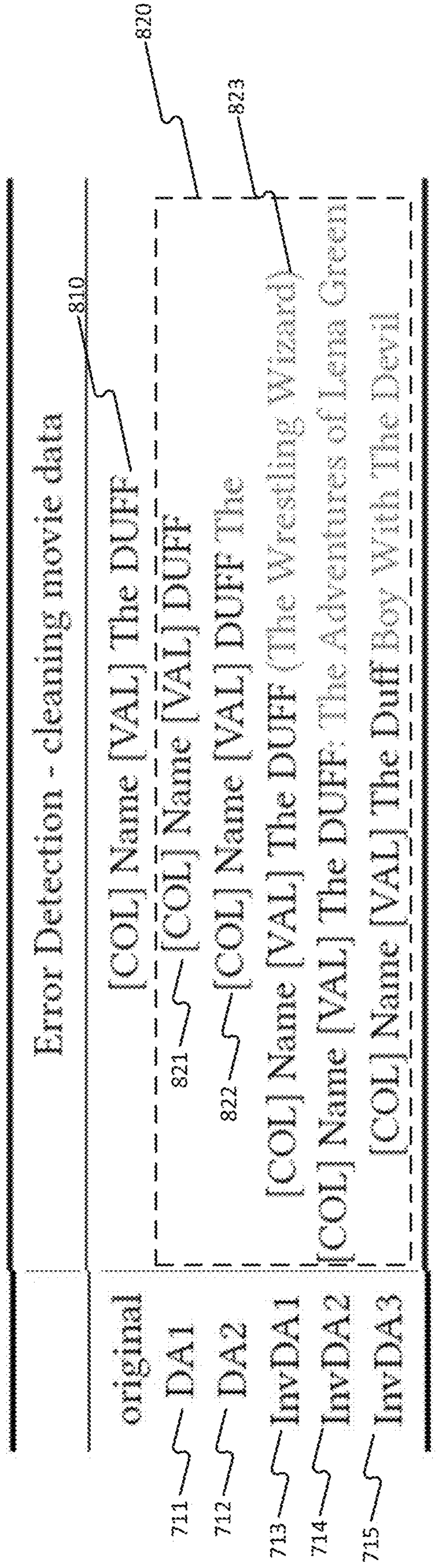
FIG. 8 shows an exemplary sequence listing for error detection as a sequence classification task, consistent with embodiments of the present disclosure.

FIG. 8 shows an exemplary sequence listing for error detection as a sequence classification task, consistent with embodiments of the present disclosure. The listing includes original sequence 810 and augmented sequences 820 generated using data augmentation operators 711-75. Baseline data augmentation operators 711-712 can do a simple token modification of original sequence 810, resulting in sequences that are either incorrect syntactically (for example, augmented sequence 822) or semantically too close to the original sequence and thus lacking diversity (for example, augmented sequence 821).

Data augmentation operators can be applied to a different training data set (e.g., original sequence 810) to generate new augmented sequences 820 for training a machine learning model for a different classification task (for example, error detection).

Figure 9:
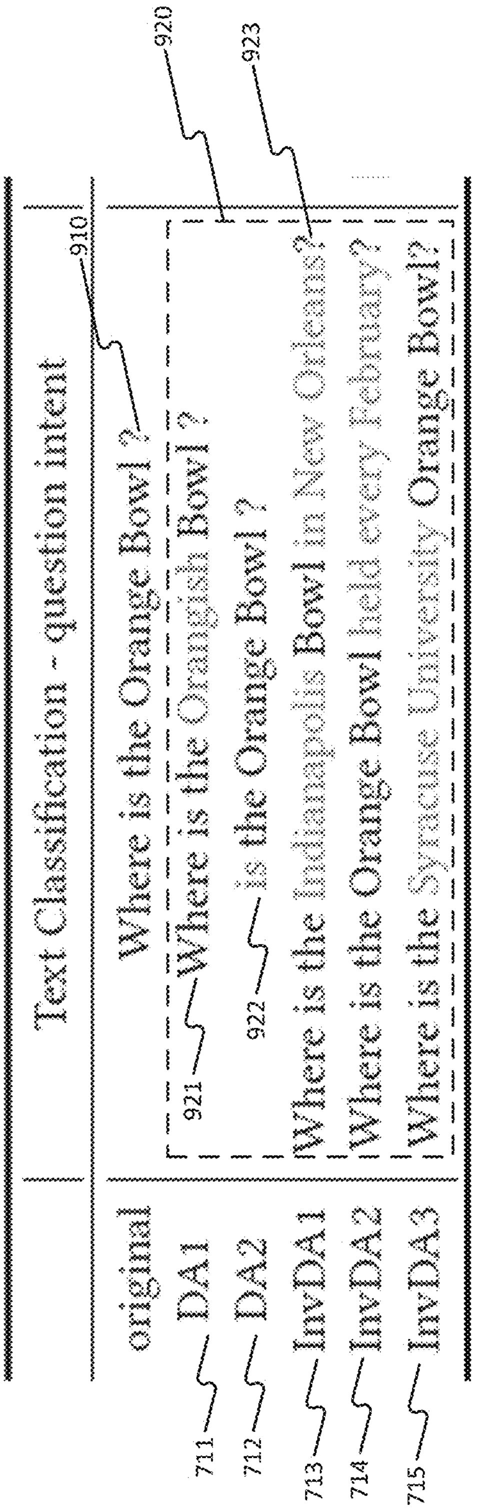
FIG. 9 shows an exemplary sequence listing text classification as a sequence classification tasks, consistent with embodiments of the present disclosure.

FIG. 9 shows an exemplary sequence listing text classification as a sequence classification tasks, consistent with embodiments of the present disclosure. The listing original sequence 910 and augmented sequences 920 generated using data augmentation operators 711-75. Baseline data augmentation operators 711-712 do a simple token modification, resulting in sequences that are either incorrect syntactically (for example, augmented sequence 922) or semantically too close to the original sequence and thus lacking diversity (for example, augmented sequence 921).

Data augmentation operators applied to original sequence 710 can be applied to a different training data set (e.g., original sequence 910) to generate new augmented sequences 920 for training a machine learning model for a different classification task (for example, error detection). Further, the same inverse data augmentation operator, such as "invdDA1" 713 when applied to different sequences (e.g., original sequences 710, 810, 910), can result in different operations applied. For example, "invDA1" 713 applied to original sequence 710 and 810 results on token insertion operation at the end of the augmented sequence, as shown in augmented sequences 723 and 823. The same operator applied to original sequence 910 results in two token insertions, as shown in augmented sequence 923. The different operations applied by the same inverse data augmentation operator (e.g., "invDA1" 713) can be based on context, such as a classification task.

FIG. 10 shows an exemplary language machine learning model with specific layers, consistent with embodiments of the present disclosure. Target model 141 can include or be connected to additional task-specific layers 1030 and 1040. Target model 141 can be used for various classification tasks by updating task-specific layers 1030 and 1040. As illustrated in FIG. 10, task-specific layers 1030 can include linear layers 1031-1033, and task-specific layers 1040 can include SoftMax layers 1041-1042.

Linear layers 1031-1032 can aid in extracting classification information of various kinds. For example, linear layer 1031 can extract sentiment classification information. As described in FIGS. 6-8 the sequential representation of tabular and key-value information in sequential format can aid in handling entity matching and error detection tasks. The classification information for such alternative tasks can be a match or no-match values or clean or dirty values.

SoftMax layers 1041-1042 can help understand the probabilities of each encoding and the associated labels. SoftMax layers 1041-1042 can understand the probabilities of each encoding by convert prediction scores of classes into a probabilistic prediction of input instance (e.g., input sequence 1020). The conversion can include converting a vector representing classes of a classification task to probability percentages. For example, input sequence 1020 with a vector (1.6, 0.0, 0.8) representing various sentiment class values can be provided as input to SoftMax layer 1041 to generate probability of positive, neutral, negative values of the sentiment classes. The output vector of probabilities generated by SoftMax layer 1041 can be close to a one-hot distribution. SoftMax layer 1041 output proximity to a distribution of percentages can be based on properties of a SoftMax function used by SoftMax layer 1041. One-hot distribution can be a multi-dimensional vector. One of the dimensions of the multi-dimensional vector can include value 1 and other dimensions can include 0 as value. A ML model can utilize the multi-dimensional vector to predict one of the class with 100% probability.

Figure 11:
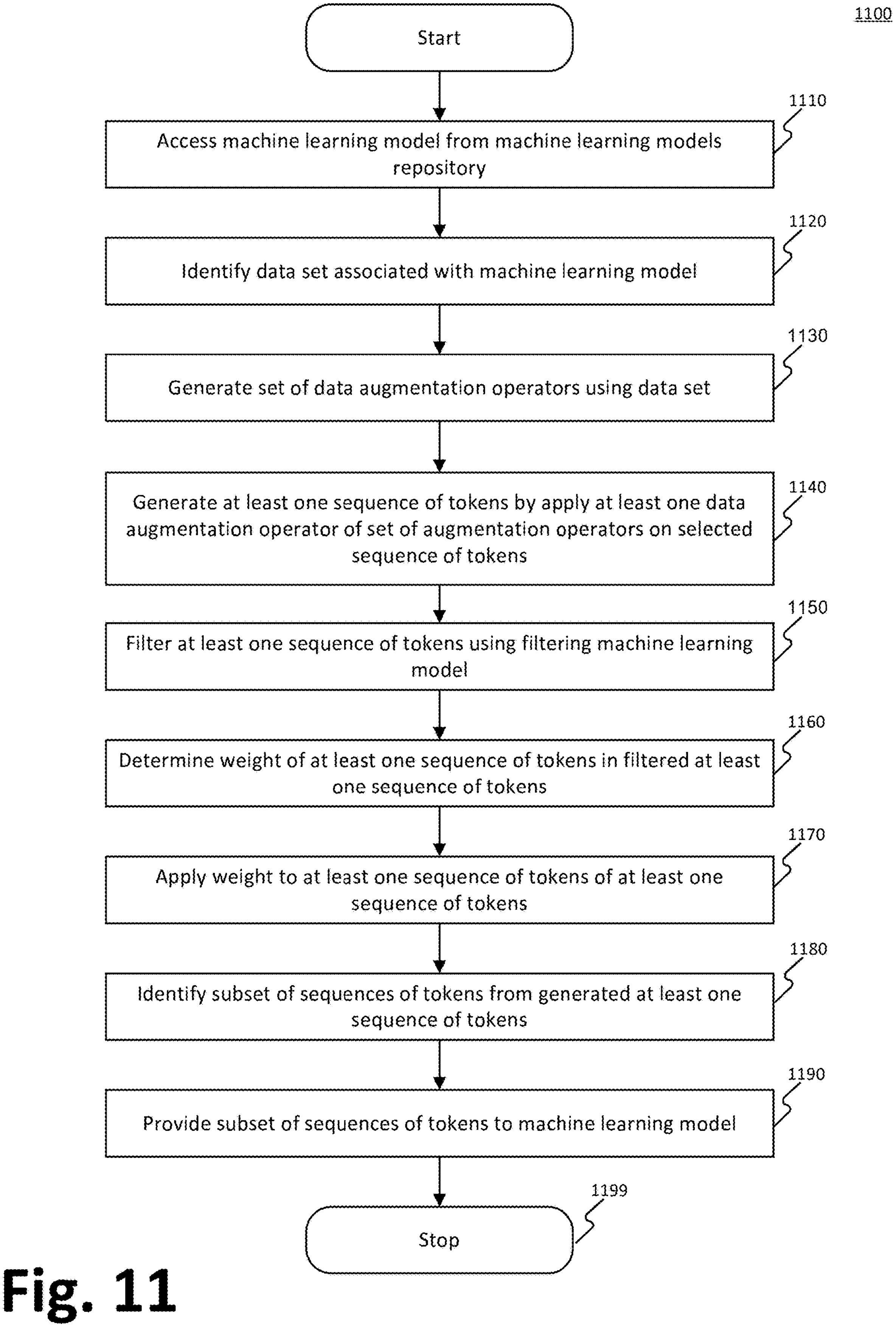
FIG. 11 is a flowchart showing an exemplary method for data augmentation operation, consistent with embodiments of present disclosure.

FIG. 11 is a flowchart showing an exemplary method for data augmentation operation, consistent with embodiments of present disclosure. The steps of method 1100 can be performed by a system (e.g., data augmentation system 100 of FIG. 1) executing on or otherwise using the features of computing device 500 of FIG. 5 for purposes of illustration. It is appreciated that the illustrated method 1100 can be altered to modify the order of steps and to include additional steps.

In step 1110, the system can access a machine learning model (e.g., target model 141 of FIG. 1) from machine learning models repository (e.g., ML models repository 140 of FIG. 1). The system can access a machine learning model (e.g., target model 141) based on a task request received by the system, such as a classification task. For example, the system can receive a request for a text classification task to do sentiment analysis of a set of comments. In some embodiments, the system can receive a request specifically to generate augmented sequences of tokens to provide training data to machine learning models. In some embodiments, the system can receive a request to train a machine learning model. In some embodiments, the system can automatically trigger a data augmentation process at regular intervals.

In step 1120, the system can identify data set (e.g., training data 411 of FIG. 4A) of the accessed machine learning model. The system can identify the data set based on various factors, such as the requested task. For example, a text classification task to conduct sentiment analysis can result in a set of review comments selected to train a machine learning model with a text classification task layer. In some embodiments, the data set can be selected based on a requested machine learning model.

In step 1130, the system can generate a set of data augmentation operators using identified data set. The system can generate set of data augmentation operators by selecting and one or more operators to the identified data set to generate modified sequences and determining operations to reverse modified sequences to the identified data set. The identified operations can result in determination of augmentation operators. In some embodiments, the system can select an input sequence from the identified data set (e.g., training data 411) to apply the data augmentation operators. Further description of the process of generating data augmentation operators to generate new sequences of tokens is presented in connection with FIG. 13 and its description below.

In step 1140, the system can apply at least one data augmentation operators of the set of data augmentation operators (e.g., data augmentation operators 421) on a selected input sequence of tokens (e.g., training data 411) to generate at least one sequence of tokens (e.g., augmented data 412). The system can select input sequences of tokens based on a policy criterion. A user can supply the policy criteria as part of the request sent in step 1110 to the system. In some embodiments, all training data (e.g., training data 411) previously associated with the accessed machine learning model (e.g., target model 141) is selected as an input sequence of tokens. In some embodiments, selecting a sequence of tokens can be based on converting training data into a sequence of tokens by serializing the training data. Serialization of training data in different formats is presented in connection with FIGS. 2A-C and their corresponding descriptions above.

The system can select data augmentation operators (e.g., data augmentation operators 421) from data augmentation operators (DAO) repository 120 that includes the set of data augmentation operators generated in step 1130. The system can select data augmentation operators based on the requested task in step 1110. In some embodiments, data augmentation operators can be selected based on the machine learning model accessed in step 1110 or an available training set (e.g., training data 411). For example, a training set for a machine learning model is limited, resulting in selecting a higher number of data augmentation operators to generate a large number of sequences of tokens to train the machine learning model. The system can apply a plurality of identified data augmentation operators to each of the selected input sequences. In some embodiments, certain data augmentation operators can be skipped based on a policy either provided by a user or determined during previous runs. A policy for selecting important new sequences of tokens and, in turn, the data augmentation operators creating the new sequences of tokens are presented in connection with FIG. 4B and its corresponding description above.

In step 1150, the system can filter at least one sequence of tokens using a filtering model (e.g., filtering model 371 of FIG. 3). A detailed description of filtering sequences of tokens is presented in connection with FIGS. 4A-B and their corresponding descriptions above.

In step 1160, the system can determine weight of at least one sequence of tokens in filtered at least one sequence of tokens. The system can use weighting model 372 to determine the weights of each sequence of tokens. A detailed description of calculating weight of sequences of tokens is presented in connection with FIGS. 4A-B and their corresponding descriptions above.

In step 1170, the system can apply weight to at least one sequence of tokens of at least one sequence of tokens. The system can apply weights only to the sequences filtered by the filtering model in step 1160. The system can apply weight by associating the calculated weight with a sequence of tokens. In some embodiments, the associations or the sequence and the associated weight can be stored in a database (e.g., text corpus repository 160).

In step 1180, the system can identify a subset of sequences of tokens (e.g., target batch 413 of FIG. 4A) from a generated at least one sequence of tokens (e.g., augmented data 412). The system can make a selection of a sequence based on the weights applied to the sequences. The system can calculate a validation loss to determine selection of subset of sequences. In some embodiments, data augmentation system can repeat steps 1160 and 1180 until the validation of loss reaches a threshold value. Filtering model 371 and weighting model 372 can be tuned by the system using validation loss to help identify the subset of sequences.

In step 1190, the system can provide selected subset of sequences of tokens as input to machine learning model (e.g., target model 141). In some embodiments, the system can store the selected subset of sequences in a training data repository (e.g., text corpus repository 160) before providing them to the training machine learning model. The system, upon completion of step 1190, completes (step 1199) executing method 1100 on computing device 500.

Figure 12:
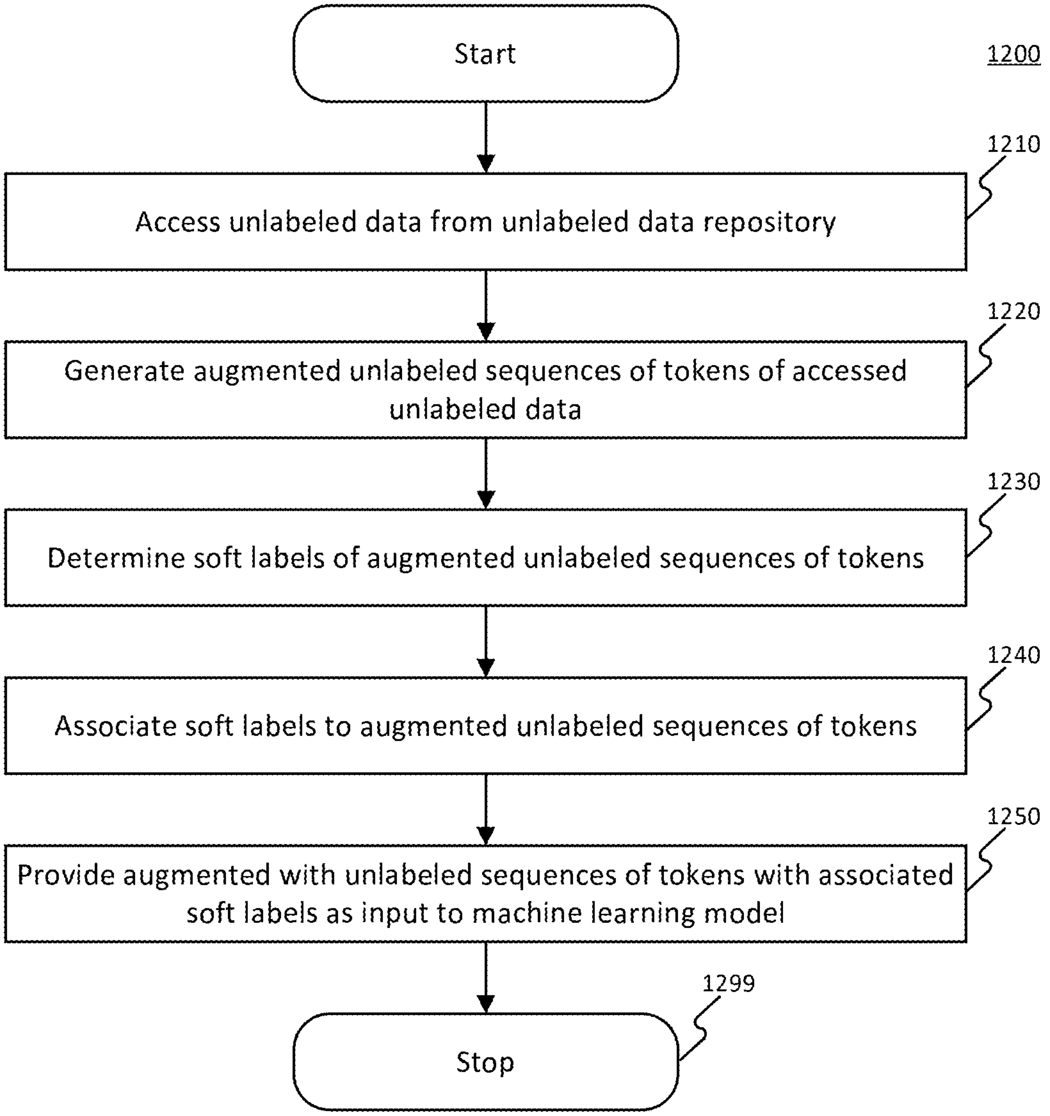
FIG. 12 is a flowchart showing an exemplary method for data augmentation operation, consistent with embodiments of the present disclosure.

FIG. 12 is a flowchart showing an exemplary method for data augmentation operation, consistent with embodiments of the present disclosure. The steps of method 1200 can be performed by the system (e.g., data augmentation system 100 of FIG. 1) executing on or otherwise using the features of computing device 500 of FIG. 5 for purposes of illustration. It is appreciated that the illustrated method 1200 can be altered to modify the order of steps and to include additional steps.

In step 1210, the system can access unlabeled data 231 from unlabeled data repository 130. The system can access unlabeled data 412 when it is configured to function in a semi-supervised learning mode. A user (e.g., user 190 of FIG. 1) may configure the system to be operated in semi-supervised mode by providing the configuration parameter as part of a request (e.g., request 195 of FIG. 1)

In step 1220, the system can generate augmented unlabeled sequences of tokens (augmented unlabeled data 432 of FIG. 4A) of accessed unlabeled data 231. The system can apply data augmentation operators (e.g., data augmentation operators 421) to unlabeled data 231 to generate the augmented unlabeled sequences of tokens. Data augmentation system can select data augmentation operators from DAO repository 120. The system can also generate data augmentation operators before applying them to unlabeled data 231. The process of generating and selecting data augmentation operators is presented in connection with FIG. 11 and its corresponding description above.

In step 1230, the system can determine soft labels of augmented unlabeled sequences of tokens (e.g., augmented unlabeled data 432). Data augmentation system can determine soft labels by guessing labels (e.g., soft labels 481) for unlabeled data 231. The system can apply the guessed soft labels to all the augmented unlabeled sequences of tokens generated from a sequence of tokens in unlabeled data 231. In some embodiments, the system can also generate soft labels for augmented unlabeled sequences of tokens by guessing the labels.

In step 1240, the system can associate soft labels to augmented unlabeled sequences of tokens. Association of labels can involve the system storing the association in a database (e.g., unlabeled data repository 130).

In step 1250, the system can provide augmented unlabeled sequences of tokens with associated soft labels as input to the machine learning model (e.g., target model 141). The system, upon completion of step 1250, completes (step 1299) executing method 1200 on computing device 500.

Figure 13:
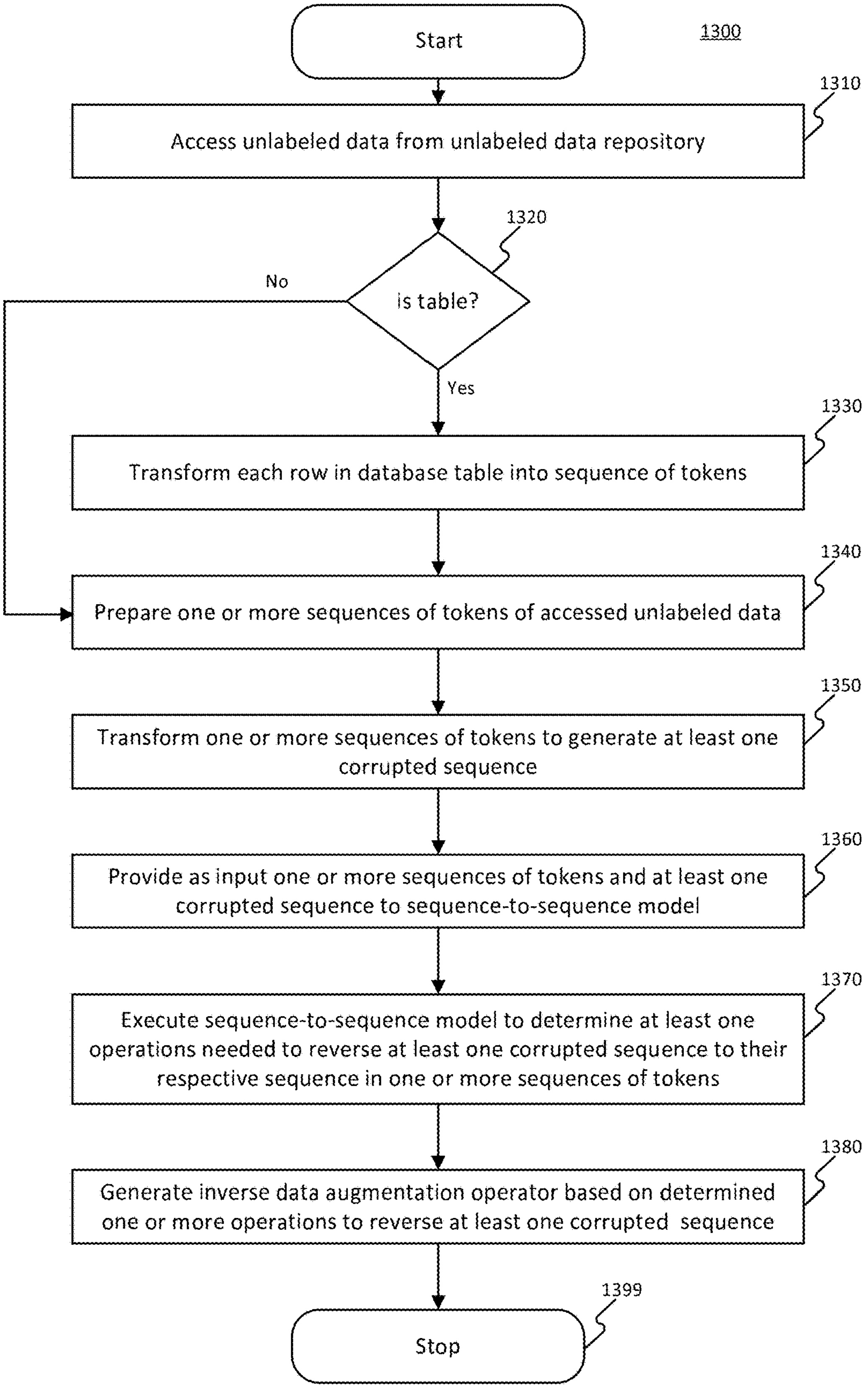
FIG. 13 is a flowchart showing an exemplary method for generating inverse data augmentation operator, consistent with embodiments of the present disclosure.

FIG. 13 is a flowchart showing an exemplary method for generating inverse data augmentation operator, consistent with embodiments of the present disclosure. The steps of method 1300 can be performed by the data augmentation operator (DAO) generator (e.g., data augmentation operator generator 110 of FIG. 1) executing on or otherwise using the features of computing device 500 of FIG. 5 for purposes of illustration. In some embodiments, other components of data augmentation system 100 can perform method 1300. It is appreciated that the illustrated method 1300 can be altered to modify the order of steps and to include additional steps.

In step 1310, the DAO generator can access unlabeled data (e.g., unlabeled data 231 of FIG. 4A) from unlabeled data repository 130. In some embodiments, the DAO generator can access unlabeled data 231 over network 180 (as shown in FIG. 1). A user (e.g., user 190 of FIG. 1) can provide unlabeled data over network 180.

In step 1320, the DAO generator can check whether the accessed unlabeled data is formatted as a database table. If the answer to the question is yes, then the DAO generator can proceed to step 1330.

In step 1330, the DAO generator can transform each row in the database table into a sequence of tokens. Serializing tabular data to sequences of tokens is presented in connection with FIGS. 2A-C and their corresponding descriptions above.

If the answer to the question in step 1320 was no, i.e., unlabeled data 231 is not formatted as a database table, then the DAO generator can jump to step 1340. In step 1340, the DAO generator can prepare one or more sequences of tokens of accessed unlabeled data. the DAO generator can prepare sequences of tokens by serializing the unlabeled data. Serializing unlabeled data can involve including markers separating tokens of the text in unlabeled data. Tokens in a text can be words in a sentence identified by separating space characters.

In step 1350, the DAO generator can transform prepared one or more sequences of tokens to generate at least one corrupted sequence (e.g., corrupted unlabeled data 232). The DAO generator can generate corrupted sequences using baseline data augmentation operators (e.g., data augmentation operators 711-712). Baseline data augmentation operators can include operators for tokens (e.g., token replacement, swap, insertion, deletion), spans including multiple tokens (e.g., span replacement, swap), or the whole sequences (e.g., back translation). the DAO generator can generate the corrupted sequences by applying multiple baseline data augmentation operators in a sequence. The DAO generator can randomly select baseline data augmentation operators to apply to sequences of tokens to generate corrupted sequences. The generated corrupted sequences map to the original sequences of tokens. In some embodiments, a single sequence of tokens can be mapped to multiple corrupted sequences generated by applying a different set of baseline data augmentation operators or the same set of baseline data augmentation operators applied in different orders.

In step 1360, the DAO generator can provide as input one or more sequences of tokens and generated at least one corrupted sequence to sequence-to-sequence model 220 (as shown in FIG. 2).

In step 1370, the DAO generator can execute sequence-to-sequence model 220 to determine one or more operations needed to reverse at least one corrupted sequence to their respective sequences in one or more sequences of tokens.

In step 1380, The DAO generator can generate a data augmentation operator (e.g., inverse data augmentation operators 713-715 of FIG. 7) based on determined one or more operations to reverse at least one corrupted sequence. The DAO generator, upon completion of step 1380, completes (step 1399) executing method 1300 on computing device 500.

Figure 14:
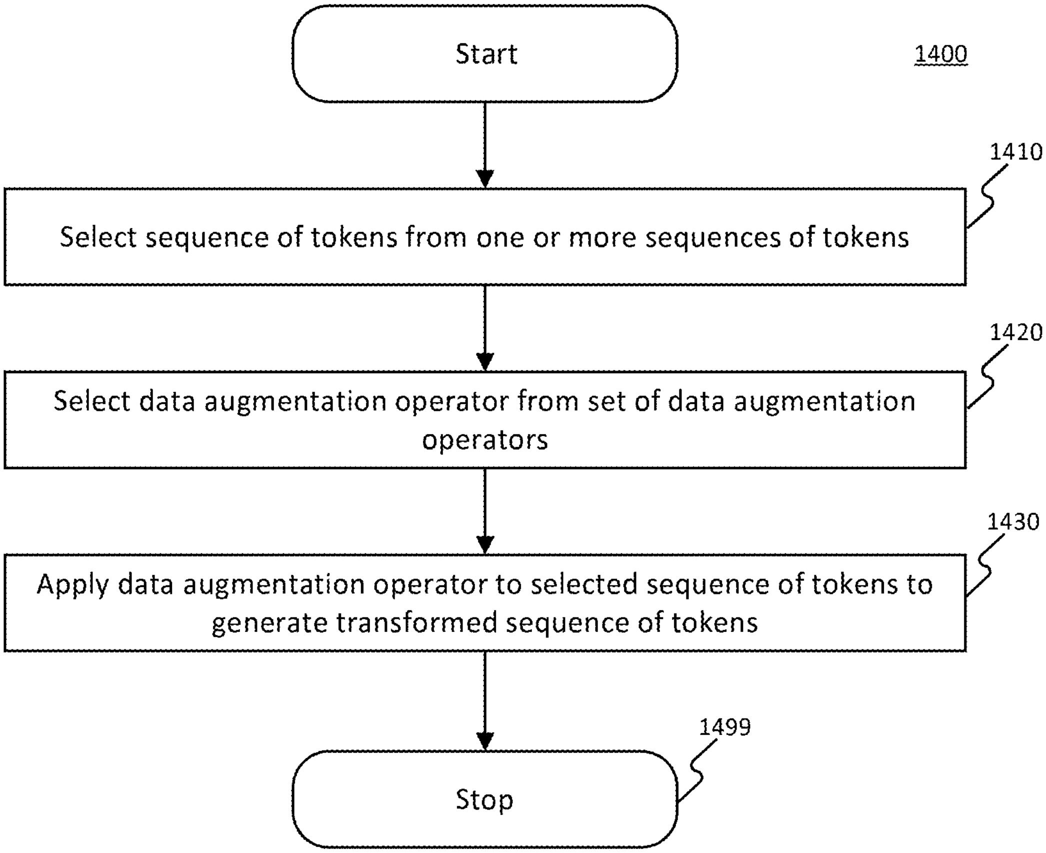
FIG. 14 is a flowchart showing an exemplary method for generating training data for a machine learning model, consistent with embodiments of the present disclosure.

FIG. 14 is a flowchart showing an exemplary method for generating training data for a machine learning model, consistent with embodiments of the present disclosure. The steps of method 1400 can be performed by data augmentation operator (DAO) generator (e.g., data augmentation operator generator 110 of FIG. 1) executing on or otherwise using the features of computing device 500 of FIG. 5 for purposes of illustration. In some embodiments, other components of data augmentation system 100 can perform method 1400. It is appreciated that the illustrated method 1400 can be altered to modify the order of steps and to include additional steps.

In step 1410, the DAO generator can select a sequence of tokens (for example, a text sentence) from one or more sequences of tokens (e.g., unlabeled data 231 of FIG. 2, training data 411 of FIG. 4A). The DAO generator can serially select sequences. In some embodiments, the DAO generator can select based on a selection criterion that relies on a request received from a user. The received request can include a classification task that can require a specific type of data.

In step 1420, sequence-to-sequence model 220 can select a data augmentation operator from a set of data augmentation operators present in DAO repository 120. Data augmentation system, 100 can pre-select the set of data augmentation operators available to the DAO generator.

In step 1430, sequence-to-sequence model 220 can apply a data augmentation operator to a selected sequence of tokens to generate a transformed sequence of tokens. The transformed sequence of tokens can include updated tokens, spans of tokens. The transformation can depend on the data augmentation operators applied to the selected sequence of tokens in step 1410. Sequence-to-sequence model 220, upon completion of step 1430, completes (step 1499) executing method 1400 on computing device 500.

Figure 15:
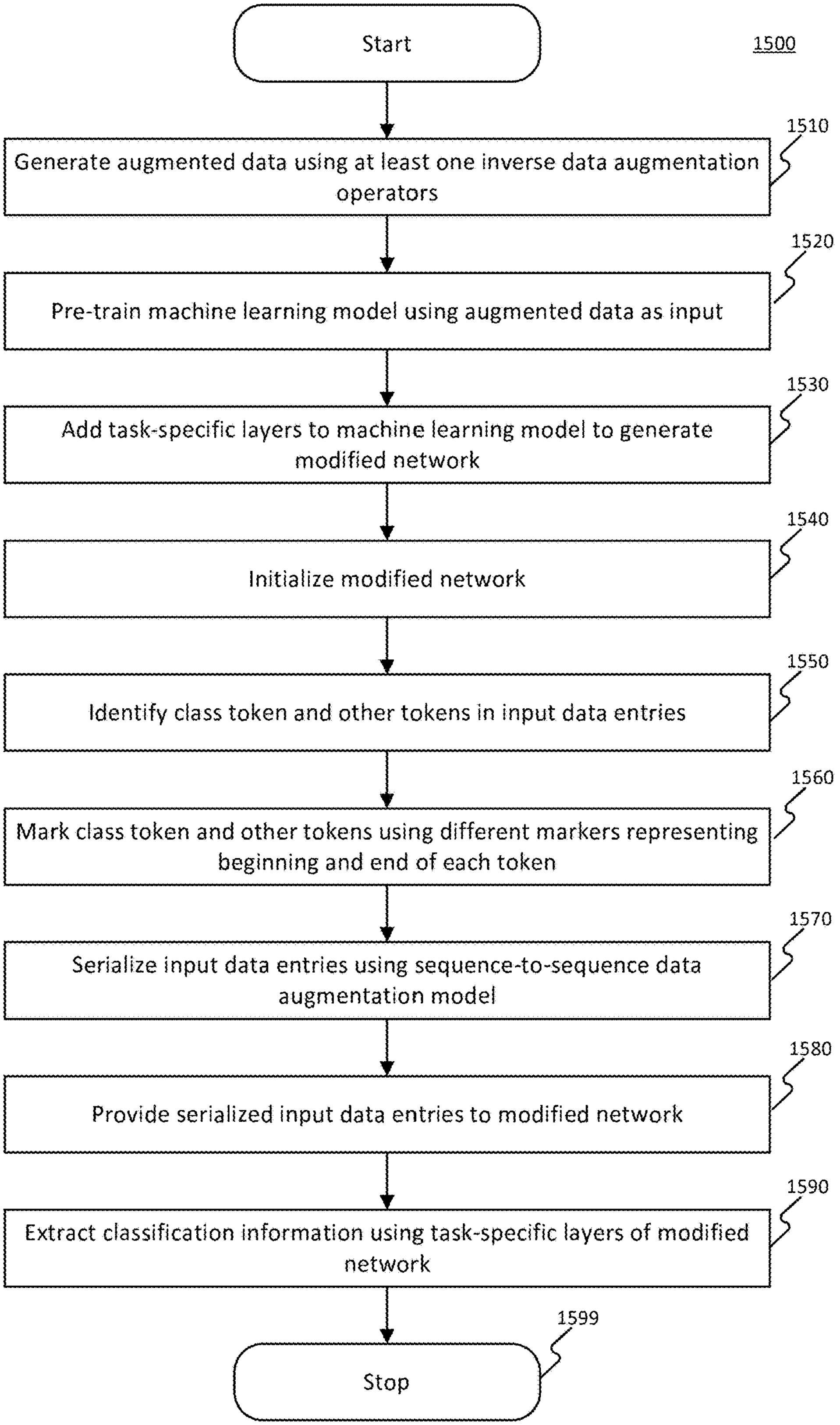
FIG. 15 is a flowchart showing an exemplary method for sequence classification task to extract classification information from an input sequence, consistent with embodiments of present disclosure.

FIG. 15 is a flowchart showing an exemplary method for sequence classification task (e.g., text classification, entity matching, error detection) to extract classification information from an input sequence, consistent with embodiments of present disclosure. The steps of method 1500 can be performed by the system (e.g., data augmentation system 100 of FIG. 1) executing on or otherwise using the features of computing device 500 of FIG. 5 for purposes of illustration. It is appreciated that the illustrated method 1500 can be altered to modify the order of steps and to include additional steps.

In step 1510, the system can generate augmented data (augmented data 412) using at least one inverse data augmentation operators (e.g., inverse data augmentation operators 713-715 of FIG. 7).

In step 1520, the system can pre-train a machine learning model (e.g., target model 141) using augmented data as training data. Training a machine learning model using augmented data is presented in connection with FIG. 4A and its corresponding description above.

In step 1530, the system can add task-specific layers (e.g., linear layers 1031-1033, SoftMax Layers 1041-1043) to the machine learning model (e.g., target model 141) to generate modified network 1000 (as shown in FIG. 10).

In step 1540, the system can initialize the modified network. The system can initialize a network by copying it to a memory and executing it on a computing device (e.g., computing device 500).

In step 1550, the system can identify class token and other tokens in the input data entries. The system can use a machine learning model meant for natural language tasks to identity the tokens. For example, a sentiment analysis mining machine learning model can identify tokens by identifying a subject and an opinion phrase addressing the subject in an example sentence.

In step 1560, the system can mark class token and other tokens using different markers representing each token's beginning and end. Data augmentation system can mark various tokens in an input sequence using the markers such as "[CLS]" and "[SEP]." In some embodiments, only the beginning of a token can be identified using a marker that can act as the end marker of a previous token.

In step 1570, the system can serialize input data entries using a sequence-to-sequence data augmentation model.

In step 1580, the system can provide serialized input data entries to the modified network. The system may associate references to the classification layers (e.g., linear layers 1031-1032, SoftMax Layers 1041-1043) that can extract the relevant classification information from the serialized input data. The associated references can be based on the request from a user (e.g., user 190) or content of input data entries. For example, if an input data entry has an intent question structure then the system may associate opinion extraction and sentiment analysis classification layers references to the input data entry.

In step 1590, the system can extract classification information using the modified network's task-specific layers. Further description of extraction of classification information is presented in connection with FIG. 10 and its corresponding description above. The system, upon completion of step 1590, completes (step 1599) executing method 1500 on computing device 500.

Example embodiments are described above with reference to flowchart illustrations or block diagrams of methods, apparatus (systems), and computer program products. It will be understood that each block of the flowchart illustrations or block diagrams, and combinations of blocks in the flowchart illustrations or block diagrams, can be implemented by computer program product or instructions on a computer program product. These computer program instructions can be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions can also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions can also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart or block diagram block or blocks.

Any combination of one or more computer readable medium(s) can be utilized. The computer readable medium can be a non-transitory computer readable storage medium. In the context of this document, a computer readable storage medium can be any tangible medium that can contain or store a program for use by or in connection with an instruction execution system, apparatus, or device.

Program code embodied on a computer readable medium can be transmitted using any appropriate medium, including but not limited to wireless, wireline, optical fiber cable, RF, IR, etc., or any suitable combination of the foregoing.

Computer program code for carrying out operations, for example, embodiments can be written in any combination of one or more programming languages, including an object-oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). The computer program code can be compiled into object code that can be executed by a processor or can be partially compiled into intermediary object code or interpreted in an interpreter, just-in-time compiler, or a virtual machine environment intended for executing computer program code.

The flowchart and block diagrams in the figures illustrate examples of the architecture, functionality, and operation of possible implementations of systems, methods, and computer program products according to various embodiments. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment can be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable storage medium storing instructions that are executable by a data augmentation system that includes one or more processors to cause the data augmentation system to perform a method for generating training data for a machine learning model, the method comprising:

accessing a first machine learning model from a machine learning model repository;

identifying a data set associated with the first machine learning model, wherein the data set is determined based on a task associated with the first machine learning model;

generating a set of data augmentation operators using the data set, wherein the set of data augmentation operators are configured to adapt transformation operations based on the task associated with the first machine learning model and prior performance data associated with the first machine learning model;

serializing the data set into serialized token sequences using markers associated with the first machine learning model;

selecting a first sequence of tokens and a second sequence of tokens from the serialized token sequences to represent the data set;

selecting a first data augmentation operator from the set of data augmentation operators;

generating a first additional sequence of tokens by applying the first data augmentation operator to the first selected sequence of tokens;

generating a second additional sequence of tokens by applying the first data augmentation operator to the second selected sequence of tokens, wherein operations performed in generating the first and the second additional sequences are different and determined based on the task associated with the first machine learning model;

assigning soft labels to one or more of the first and second additional sequence of tokens, wherein the soft labels are based on proximity metrics determined by existing labeled training data;

executing a filtering machine learning model trained to minimize validation loss of the first machine learning model, wherein the filtering machine learning model is configured to select a first subset of the generated additional sequences of tokens and discard one of the first subset of selected sequences of tokens;

executing a weighting machine learning model trained to assign weights to the first subset based on an estimated contribution, wherein the estimated contribution is based on the validation loss associated with the first machine learning model;

selecting a second subset from the weighted first subset based on an output of the executing of the filtering machine learning model or the weighting machine learning model;

storing the second subset in a training data repository; and providing the stored second subset as training data to train the first machine learning model.

2. The non-transitory computer readable medium of claim 1, wherein generating a set of data augmentation operators using the data set further comprises:

selecting one or more data augmentation operators;

generating sequentially formatted input sequences of tokens of the identified data set;

applying the one or more data augmentation operators to at least one sequence of tokens of the sequentially formatted input sequences of tokens to generate at least one modified sequence of tokens; and determining the set of augmentation operators to reverse the at least one modified sequence of tokens to corresponding sequentially formatted input sequences of tokens.

3. The non-transitory computer readable medium of claim 1, wherein the first machine learning model is a sequence-to-sequence machine learning model.

4. The non-transitory computer readable storage medium of claim 1, wherein selecting the second subset from the weighted first subset further comprises:

filtering one or more of the first or second additional sequence of tokens using the filtering machine learning model, wherein the filtering removes unwanted additional sequences of tokens based on their contribution to training of the first machine learning model;

determining a weight of at least one of the filtered additional sequences of tokens using the weighting machine learning model; and applying the weight to the at least one filtered additional sequence of tokens.

5. The non-transitory computer readable storage medium of claim 4, wherein the weight is determined based on an importance of the at least one filtered additional sequence of tokens in training the filtering machine learning model.

6. The non-transitory computer readable storage medium of claim 5, wherein the importance of the at least one filtered additional sequence of tokens is determined by calculating a validation loss of the first machine learning model.

7. The non-transitory computer readable storage medium of claim 6, wherein the filtering machine learning model is trained using the validation loss.

8. The non-transitory computer readable storage medium of claim 6, wherein the weighting machine learning model is trained using the validation loss.

9. The non-transitory computer readable storage medium of claim 8, wherein the weighting machine learning model is trained until the validation loss reaches a threshold value.

10. The non-transitory computer readable storage medium of claim 1, wherein the first data augmentation operator includes at least one of a token deletion operator, token insertion operator, token replacement operator, token swap operator, span deletion operator, span shuffle operator, column shuffle operator, column deletion operator, entity swap operator, back translation operator, class generator operator, or inverse data augmentation operator.

11. The non-transitory computer readable storage medium of claim 10, wherein the inverse data augmentation operator is a combination of multiple data augmentation operators.

12. The non-transitory computer readable storage medium of claim 1, wherein the operations performed in generating the first and the second additional sequences are context dependent.

13. The non-transitory computer readable storage medium of claim 1, wherein providing the stored second subset to train the first machine learning model further comprises:

accessing unlabeled data from an unlabeled data repository;

generating augmented unlabeled sequences of tokens of the accessed unlabeled data;

determining soft labels of the augmented unlabeled sequences of tokens; and providing the augmented unlabeled sequences of tokens with associated soft labels as input to train the first machine learning model.

14. A non-transitory computer readable storage medium storing instructions that are executable by a data augmentation system that includes one or more processors to cause the data augmentation system to perform a method for generating data augmentation operators to generate augmented sequences of tokens, the method including operations comprising:

accessing unlabeled data from an unlabeled data repository;

preparing one or more sequences of tokens of the accessed unlabeled data, wherein the one or more sequences are serialized using markers associated with a target machine learning model;

transforming the serialized sequences of tokens to generate a first corrupted sequence and a second corrupted sequence by applying a same data augmentation operator, wherein operations in generating the first and the second corrupted sequences are different and determined based on a task associated with the target machine learning model;

providing as input, by the data augmentation system, the first corrupted sequence and the second corrupted sequence to a trained sequence-to-sequence model of the data augmentation system;

executing the trained sequence-to-sequence model using one or more processors of the data augmentation system to determine one or more inverse transformation operations that map the first or the second corrupted sequence to the sequence of tokens used to generate the first or the second corrupted sequence, wherein the one or more inverse transformation operations are determined based on prior performance data associated with the target machine learning model;

generating one or more inverse data augmentation operators based on the determined one or more inverse transformation operations, wherein the one or more inverse data augmentation operators are configured to reverse the first or the second corrupted sequence based on a task associated with the target machine learning model and the prior performance data; and training the target machine learning model to perform the task using training data generated by applying the one or more inverse data augmentation operators.

15. The non-transitory computer readable storage medium of claim 14, wherein preparing one or more sequences of tokens of the accessed unlabeled data further comprises:

transforming each row in a database table into a corresponding sequence of tokens, wherein the corresponding sequence of tokens includes indicators for a beginning and an end of a column value.

16. The non-transitory computer readable medium of claim 14, wherein transforming the serialized sequences of tokens further comprises:

selecting a first sequence of tokens from the serialized sequences of tokens;

selecting a data augmentation operator from a set of data augmentation operators; and applying the selected data augmentation operator to the selected first sequence of tokens.

17. The non-transitory computer readable medium of claim 16, wherein transforming the serialized sequences of tokens further comprises:

generating an aggregate corrupted sequence by selecting and applying a plurality of the set of data augmentation operators in a sequential order to the selected first sequence of tokens.

18. A non-transitory computer readable storage medium storing instructions that are executable by a data augmentation system that includes one or more processors to cause the data augmentation system to perform a method for extracting classification information from input data, the method including operations comprising:

modifying a first machine learning model by adding task-specific layers to generate a modified network, wherein the task specific layers are trained to extract classification signals for a downstream task;

initializing the modified network of the first machine learning model and the added task-specific layers;

selecting input data entries by one or more processors of the data augmentation system, wherein selecting includes serializing the input data entries using markers associated with the first machine learning model;

providing the serialized input data entries to the modified network;

extracting, by one or more processors of the data augmentation system, classification information using the task-specific layers of the modified network;

transforming, by the data augmentation system, the serialized input data entries to generate different augmented data entries by applying a same data augmentation operator to the serialized input data entries, wherein operations in generating the different augmented data entries are different and determined based on a task associated with a second machine learning model and prior performance data associated with the second machine learning model;

filtering the generated different augmented data entries based on the extracted classification information, wherein filtering includes discarding one or more of the augmented data entries based on validation loss metrics associated with the second machine learning model; and training the second machine learning model using the filtered augmented data entries as training data.

19. The non-transitory computer readable medium of claim 18, wherein the operations further comprise:

generating the different augmented data entries using at least one inverse data augmentation operator; and pre-training the first machine learning model using the different augmented data entries.

20. The non-transitory computer readable medium of claim 18, wherein serializing the input data entries further comprises:

identifying a class token and other tokens in the selected input data entries; and marking the class token and the other tokens using different markers representing a beginning and an end of each token.

* * * * *